US012786264B1

(12) United States Patent
Johnson et al.

(10) Patent No.: US 12,786,264 B1
(45) Date of Patent: Nov. 3, 2026

(54) REMOTE CONTROL AND MONITORING OF A LOCALLY EXECUTING GENERATIVE AGENT

(71) Applicant: OpenAI OpCo, LLC, San Francisco, CA (US)

(72) Inventors: Maxwell Johnson, San Francisco, CA (US); Javier Soto Bustos, Oakland, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/631,809

(22) Filed: Mar. 27, 2026

(51) Int. Cl.
*G06F 3/01* (2006.01)
*H04L 67/025* (2022.01)

(52) U.S. Cl.
CPC .................................. *H04L 67/025* (2013.01)

(58) Field of Classification Search
None
See application file for complete search history.

(56) References Cited

U.S. PATENT DOCUMENTS

2020/0076862 A1* 3/2020 Eliason ............... G06F 3/04897
2025/0182010 A1* 6/2025 Estruch Tena ............................... G06Q 10/063114
2025/0259184 A1* 8/2025 Pasumarthi .............. G06N 5/02
2026/0073329 A1* 3/2026 Rezaeian ......... G06Q 10/06316
2026/0087414 A1* 3/2026 Xiao ...................... G06N 20/00
2026/0122119 A1* 4/2026 Eltom ................... H04L 65/403

* cited by examiner

*Primary Examiner* — Nicholas P Celani
*Assistant Examiner* — Wuji Chen
(74) *Attorney, Agent, or Firm* — Keller Preece PLLC

(57) ABSTRACT

The present disclosure relates to systems, non-transitory computer-readable media, and methods for remotely monitoring and/or modifying operations of a locally executing generative agent operating on an executing client device. In some embodiments, the disclosed systems can establish a persistent bi-directional connection between the executing client device and a backend runtime service. The disclosed systems can utilize the backend runtime service to construct a mirrored task object based on executable tasks performed by the locally executing generative agent. Further, the disclosed systems can provide a visual representation of the mirrored task object for display on a remote client device. Based on determining an interaction with the visual representation, the disclosed systems can utilize the persistent bi-directional connection to modify operations of the locally executing generative agent.

20 Claims, 11 Drawing Sheets

REMOTE CONTROL AND MONITORING OF A LOCALLY EXECUTING GENERATIVE AGENT

BACKGROUND

Generative artificial intelligence ("AI") systems have advanced rapidly, increasingly incorporating large-scale models and high-value computational assets that support sophisticated inference and decision-making capabilities while supporting dynamic user experiences. As these systems have evolved, generative AI functionality has been accessed through diverse communication mechanisms and interface arrangements that enable initiation and management of generative agent operations. For example, existing systems may support different modes of interaction and operation depending on implementation constraints and usage scenarios. Despite these advances, existing systems continue to exhibit a number of disadvantages, particularly in connection with deployment and operation of generative AI models, including in operational flexibility in locally executing agents.

As just mentioned, conventional generative AI systems often employ conventional on-premises control paradigms which limit control and monitoring of generative agents to the executing device. To illustrate, conventional systems rigidly rely on locally installed software environments and device-native interfaces to initiate and manage locally executing generative agents. Utilizing local runtime environments inherently confines operation of locally executing generative agents to host-device-bound execution contexts and interaction mechanisms, thereby constraining operation of the locally executing generative agent to availability of the host device.

While some existing systems do provide remote access to computational processes and execution environments, such as virtual machines or remote desktops, these systems are nevertheless not adapted to generative agents. Rather, conventional generative AI systems utilize remote access methodologies that are structured around machine-level interactions which are not tailored to generative agents. Conventional virtual machines and remote desktops provide general access to remote computing devices but do not integrate with generative agents on a lifecycle-event level for nuanced control and monitoring.

These along with additional problems and issues exist with regard to existing systems.

BRIEF SUMMARY

Embodiments of the present disclosure provide benefits and/or solve one or more of the foregoing or other problems in the art with systems, non-transitory computer-readable media, and methods for remotely monitoring and/or modifying operations of a locally executing generative agent operating on a local runtime environment of an executing client device (e.g., a host device). In one or more embodiments, the disclosed systems establish a persistent bi-directional connection between the executing client device and a backend runtime service. Based on establishing the persistent bi-directional connection, the disclosed systems generate, at the backend runtime service, a mirrored task object based on executable tasks that the locally executing generative agent performs on the executing client device. Further, the disclosed systems can provide a visual representation of the mirrored task object for display on a remote agent control interface of a remote client device. Accordingly, the disclosed systems can utilize the remote client device to remotely monitor operations of the locally executing generative agent. Further, based on determining an interaction with the visual representation of the mirrored task object, the disclosed systems can remotely modify operations of the locally executing generative agent.

In one or more embodiments, the disclosed systems identify an enterprise environment that includes multiple executing client devices that correspond to a user account. Based on identifying the enterprise environment, the disclosed systems can modify the persistent bi-directional connection to connect one or more of the multiple executing client devices to the backend runtime service. The disclosed systems can utilize the enterprise environment to distribute and/or orchestrate performance of executable tasks among locally executing generative agents that correspond to different executing client devices of the enterprise environment. Moreover, the disclosed systems can modify the mirrored task object based on identifying executable tasks performed by different executing client devices of the enterprise environment.

Similarly, in some embodiments the disclosed systems identify a multi-user-account environment that includes multiple executing client devices (hosting corresponding locally executing generative agents) that correspond to different user accounts. The disclosed systems can modify the persistent bi-directional connection to include one or more of the multiple executing client devices and can utilize the persistent bi-directional connection to distribute executable tasks among the different executing client devices. Further, the disclosed systems can modify the mirrored task object based on identifying, via the persistent bi-directional connection, instantiation and/or execution of executable tasks by locally executing generative agents of the multi-user-account environment.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
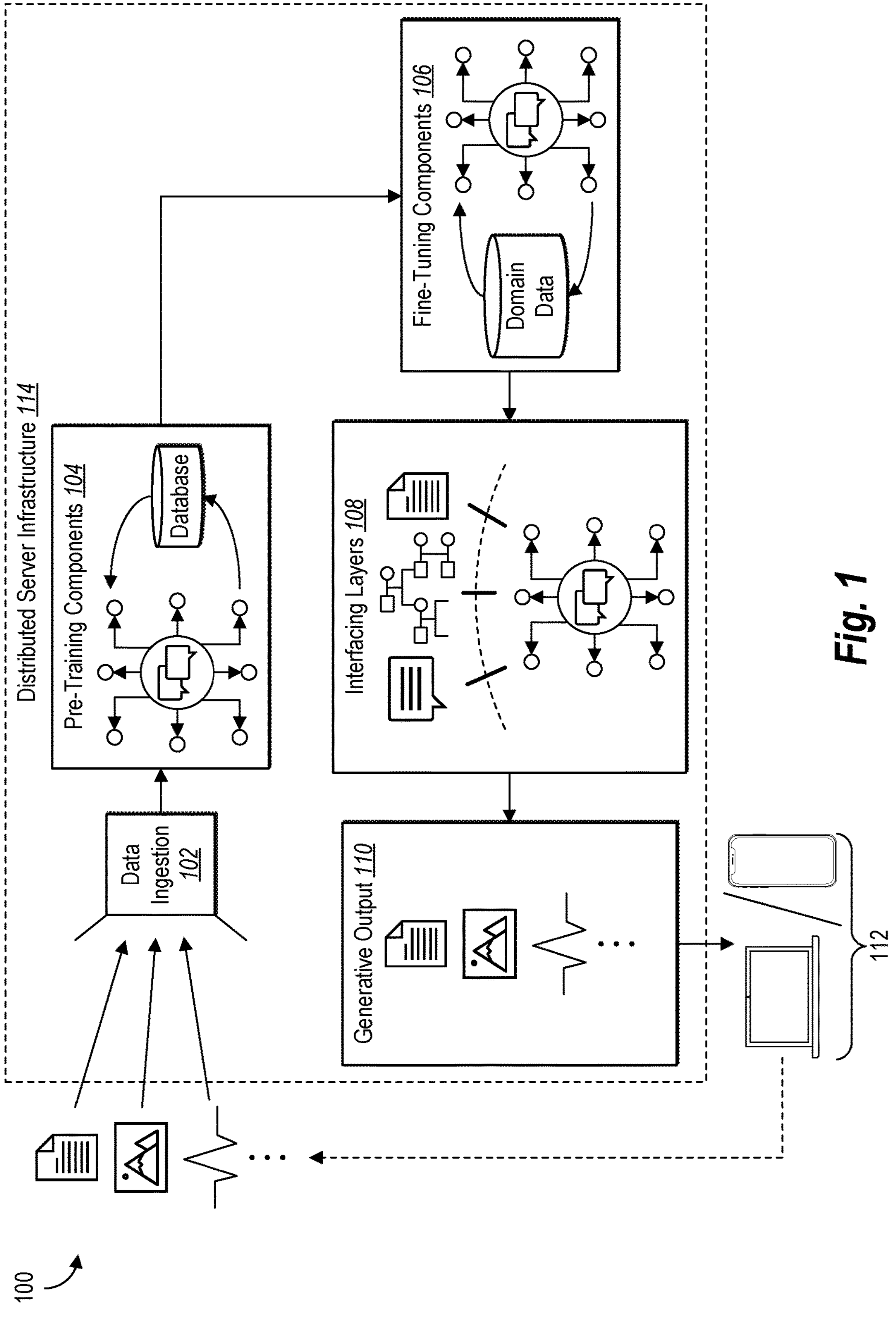
FIG. 1 illustrates a high-level architecture of a generative artificial intelligence (AI) system for implementing large language models and other generative models in accordance with one or more embodiments.

This disclosure describes one or more embodiments of a remotely controlling agentic system that remotely monitors operations of and/or modifies operations of a locally executing generative agent operating on an executing client device. For example, the remotely controlling agentic system can establish a persistent bi-directional connection between the locally executing generative agent and a backend runtime service. The remotely controlling agentic system can utilize the persistent bi-directional connection to identify operations, such as executable tasks, performed by the locally executing generative agent on the executing client device. Further, the remotely controlling agentic system can generate, at the backend runtime service, a mirrored task object that includes the executable tasks performed by the locally executing generative agent. Moreover, the remotely controlling agentic system can provide a visual representation of the mirrored task object for display on a remote agent control interface of a remote client device. Based on determining an interaction with the visual representation, the remotely controlling agentic system can remotely modify operations of the locally executing generative agent operating on the executing client device.

In some embodiments, the remotely controlling agentic system can generate or otherwise modify the persistent bi-directional connection to include multiple executing client devices. For example, the remotely controlling agentic system can identify an enterprise environment that includes multiple client devices (and corresponding locally executing generative agents) that correspond to an enterprise account. Additionally or alternatively, the remotely controlling agentic system can identify a collaborative, multi-user-account environment that includes multiple client devices (and corresponding locally executing generative agents) that correspond to different user accounts. The remotely controlling agentic system can utilize the enterprise environment and/or the multi-user-account environment to monitor and/or orchestrate executable tasks among different client devices within the enterprise environment and/or the multi-user account environment.

Further, the remotely controlling agentic system can remotely control operations of a locally executing generative agent through remote command injection and intervention. For example, the remotely controlling agentic system can determine a task modification from the interaction with the visual representation. Based on determining the task modification, the remotely controlling agentic system can modify the mirrored task object at the backend runtime service. Further, via the persistent bi-directional connection, the remotely controlling agentic system can propagate the modification to the locally executing generative agent to modify operations of the locally executing generative agent. Accordingly, the remotely controlling agentic system can utilize the persistent bi-directional connection to remotely modify operations of the locally executing generative agent (or multiple locally executing generative agents within an enterprise environment and/or a multi-user-account environment).

FIG. 1 illustrates a high-level architecture of a generative artificial intelligence (AI) system 100 for implementing large language models and other generative models to enable natural language processing, conversational interfaces, multimodal content generation, and analysis in accordance with one or more embodiments. The generative AI system 100 may include data ingestion pipelines 102, pre-training components 104, fine-tuning components 106, interfacing layers 108, and supporting hardware in the form of a distributed server infrastructure 114.

The data ingestion pipelines 102 of the generative AI system 100 may receive and preprocess large volumes of structured and unstructured data, including text corpora, image datasets, video datasets, and audio datasets, to support diverse generative model training. Preprocessing may include deduplication, tokenization, normalization, feature extraction (e.g., spectrogram generation for audio), and content safety filtering, preparing data for effective distributed training across server devices.

The pre-training components 104 of the generative AI system 100 may utilize transformer-based architectures for LLMs, as well as additional generative models such as diffusion models for image generation, autoencoders for representation learning, and multimodal transformer models for cross-domain generation tasks. These models may be configured with deep neural network stacks to capture hierarchical, semantic, and contextual relationships within the data.

The generative AI system 100 may employ diffusion models for image and video generation, where the models learn to iteratively denoise random noise into structured outputs conditioned on textual or other modality inputs. The generative AI system 100 may train these models using score-based or denoising diffusion probabilistic methods across distributed server devices within the distributed server infrastructure 114.

The generative AI system 100 may also implement speech generation models, including text-to-speech (TTS) systems using autoregressive or non-autoregressive architectures, and audio diffusion models capable of generating highfidelity waveforms conditioned on linguistic and prosodic features. Feature extraction components may preprocess audio data to create Mel-spectrograms or other representations used during model training using the pretraining components 104.

Specialty server devices within the generative AI system 100, such as those of the distributed server infrastructure 114, may include GPUs, TPUs, or custom AI accelerators designed for high-throughput operations supporting both transformer and diffusion model training. These servers may differ from ordinary servers by incorporating high-bandwidth memory (HBM), advanced interconnects (e.g., NVLink, PCIe Gen5), and thermal and power management systems optimized for large-scale generative model workloads.

The generative AI system 100 may store shard-specific checkpoints, intermediate latents, and optimizer states for large-scale diffusion models, LLMs, and multimodal models on high-speed local or network-attached storage within the specialty servers, enabling resumption of training and inference jobs after interruptions or updates.

The fine-tuning components 106 of the generative AI system 100 may adapt generative models to specific user tasks or domain tasks, such as personalized content generation, domain-specific summarization, image style transfer, or voice cloning. Fine-tuning may involve supervised fine-tuning on task-specific datasets and reinforcement learning with human feedback (RLHF) where applicable, with data and gradients distributed across server devices for scalable operation.

The interfacing layers 108 of the generative AI system 100 may handle user prompts for LLM-based text generation, text-to-image generation requests, and speech synthesis requests. The system may tokenize or encode user prompts, generate conditioning latents where applicable (e.g., CLIP embeddings for image generation), and distribute inference tasks across server clusters for each modality-specific generative model. The interfacing layers 108 may include computer scripts, subroutines, or integrated tools for processing prompts, implementing models, and/or performing API calls to supplement and/or augment generative functions of LLMs and other models of the generative AI system 100. In some embodiments, the interfacing layers 108 include databases for accessing stored content (e.g., a vector database of content vectors for comparing with prompt vectors or query vectors) for contextual augmentation of model operation (e.g., for retrieval-augmented generation and its analogs). In some embodiments, the interfacing layers 108 integrate functionality from third-party systems (e.g., external to the generative AI system 100 and/or the distributed server infrastructure 114) into the generative AI system 100 using APIs and/or particular communication protocols to interact with generative model data (e.g., to execute generated code).

As illustrated in FIG. 1, the generative AI system 100 generates generative output 110. The generative AI system 100 can generate the generative output 110 in the form of text responses, images, videos, audio clips, or other multimodal digital content. The generative AI system 100 can generate the generative output 110 using the interfacing layers 108 in conjunction with one or more trained (e.g., pre-trained and fine-tuned, using the described components) generative models, including LLMs and others described herein.

In some embodiments, the generative AI system 100 generates the generative output 110 over one or more conversational interactions or turns with client device(s) 112. Indeed, the generative AI system 100 can provide the generative output 110 for display on the client device(s) 112. In addition, the generative AI system 100 can receive additional input in the form of text-based queries or prompts, images, videos, audio clips, and/or other multimodal content as part of an ongoing conversation between the generative AI system 100 and the client device(s) 112 and/or as part of a new conversation or instantiation of the generative AI system 100.

For large generative models exceeding single-device memory, the generative AI system 100 may implement model parallelism, with different server devices processing partitions of the model during inference across the distributed server infrastructure 114, and may use activation checkpointing and memory recomputation strategies to handle resource constraints efficiently across distributed modalities.

Server devices within the generative AI system 100 may utilize high-bandwidth interconnects for low-latency tensor and latent exchange during multi-stage generation processes (e.g., latent generation followed by decoding in diffusion models). This enables the generative AI system 100 to support complex, multi-step generation tasks, such as generating text and subsequently generating images conditioned on the generated text, while maintaining low latency.

The distributed server infrastructure 114 of the generative AI system 100 may include compute clusters with racks of specialty servers interconnected with high-bandwidth networking technologies such as InfiniBand, RDMA-enabled Ethernet, or custom fabrics, and distributed storage using NVMe over Fabrics (NVMe-oF) for rapid access to large model weights, intermediate outputs, and context data during inference.

The distributed server infrastructure 114 can include safety filtering and content moderation layers that operate in parallel with inference pipelines across modalities, applying token-level filtering for LLM outputs, image or video classification for generated visual content, and audio analysis for speech outputs to ensure outputs comply with operational policies and applicable regulations.

The distributed server infrastructure 114 can include orchestration and resource management layers that dynamically allocate compute, memory, and network resources across modalities, scaling generative model training and inference in response to user demand and system load while monitoring resource health across components of the generative AI system 100.

Collectively, the architecture illustrated in FIG. 1 enables the generative AI system 100 to provide scalable, efficient, and safe generative model services across text, image, video, audio, and other modalities, leveraging specialty server devices and distributed computing for high-throughput training, fine-tuning, and inference across a wide variety of generative AI applications.

Figure 2:
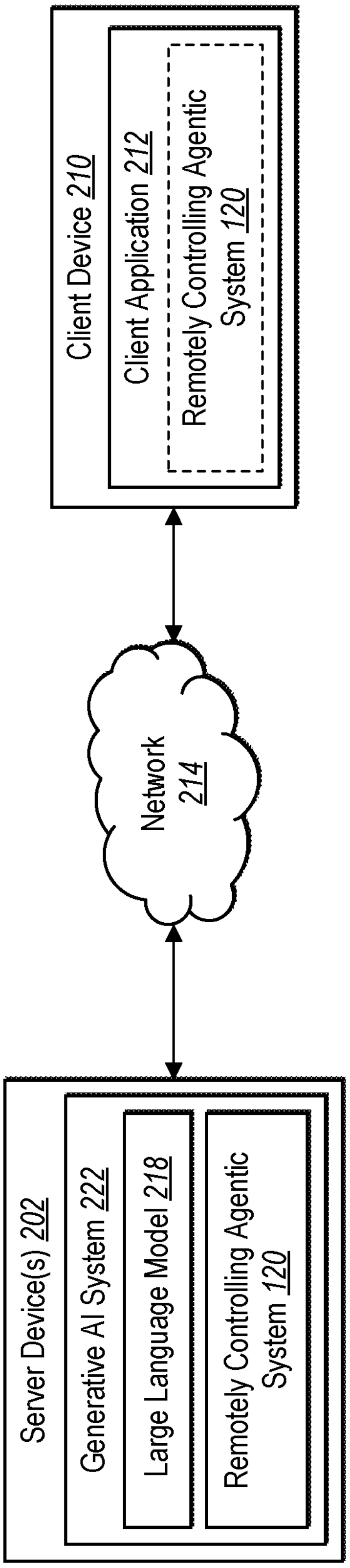
FIG. 2 illustrates a diagram of an environment in which a remotely controlling agentic system operates in accordance with one or more embodiments.

FIG. 2 illustrates a schematic diagram of an example system environment for implementing a remotely controlling agentic system 120 in accordance with one or more implementations. An overview of the remotely controlling agentic system 120 is described in relation to FIG. 2. As shown, the environment includes server device(s) 202, a client device 210, and a network 214. Each of the components of the environment can communicate via the network 214, and the network 214 may be any suitable network over which computing devices can communicate. Example networks are discussed in more detail below in relation to FIGS. 10-11.

As just mentioned, the example environment includes a client device 210. The client device 210 can be one of a variety of computing devices, including a smartphone, a tablet, a smart television, a desktop computer, a laptop computer, a virtual reality device, an augmented reality device, or another computing device as described below in relation to FIGS. 10-11. The client device 210 can communicate with the server device(s) 202 via the network 214. For example, the client device 210 can receive user input from a user interacting with the client device 210 (e.g., via a client application 212) to, for instance, interact with a generative AI system 222 located on the server device(s) 202. In addition, the remotely controlling agentic system 120 on the server device(s) 202 can receive information relating to various interactions with user interface elements based on the input received by the client device 210.

As shown, the client device 210 can include the client application 212. In particular, the client application 212 may be a web application, a native application installed on the client device 210 (e.g., a mobile application, a desktop application, etc.), or a cloud-based application where all or part of the functionality is performed by the server device(s) 202. Based on instructions from the client application 212, the client device 210 can present or display information, including a dialogue between a user and a large language model 218.

As illustrated in FIG. 2, the example environment includes the server device(s) 202. The server device(s) 202 may generate, track, store, process, receive, search, communicatively link, and transmit electronic data, such as digital content (e.g., content items), datasets, messages, searchable data, pages of data, prompts, interface elements, searches, browsing activity, browsing data, session requests, mirrored task objects, and/or interactions between user accounts or client devices and the generative AI system 222. For example, the server device(s) 202 may receive data from the client device 210 in the form of a user prompt or query. Additionally, the server device(s) 202 can process inputs through the large language model 218 and return generated outputs such as text, summaries, code, or images. In some embodiments, the server device(s) 202 manage auxiliary tasks such as session tracking, context management, content filtering, and integration with databases or external tools. Indeed, the server device(s) 202 can communicate with the client device 210 to send and/or receive data via the network 214. In some implementations, the server device(s) 202 comprise a distributed server where the server device(s) 202 include a number of server devices distributed across the network 214 and located in different physical locations. The server device(s) 202 can comprise one or more content servers, application servers, communication servers, web-hosting servers, machine learning servers, and other types of servers.

As shown in FIG. 2, the server device(s) 202 can also include the remotely controlling agentic system 120 as part of the generative AI system 222. The generative AI system 222 (e.g., the generative AI system 100) can communicate with the client device 210 to perform various functions associated with the client application 212 such as receiving text prompts or queries and generating outputs using the large language model 218. The generative AI system 222 ingests structured or unstructured input data and uses the large language model 218 to intelligently produce outputs. The generative AI system 222 can further interface with backend infrastructure to manage contextual states, retrieve relevant documents, and update session-specific information. In some examples, the generative AI system 222 interacts with a cloud storage module to access user-linked content items or synchronize generated outputs with external third-party applications.

Although FIG. 2 depicts the remotely controlling agentic system 120 located on the server device(s) 202, in some implementations, the remotely controlling agentic system 120 may be implemented by (e.g., located entirely or in part on) one or more other components of the environment. For example, the remotely controlling agentic system 120 may be implemented by the client device 210 and/or a third-party device. For example, the client device 210 can download all or part of the remotely controlling agentic system 120 for implementation independent of, or together with, the server device(s) 202. In some embodiments, the remotely controlling agentic system 120 is implemented as a plug-in or modular extension associated with the large language model 218.

In some implementations, the environment may have a different arrangement of components and/or may have a different number or set of components altogether. For example, the client device 210 may communicate directly with the remotely controlling agentic system 120, bypassing the network 214. As another example, the environment can include a database located externally to the server device(s) 202 (e.g., in communication with the server device(s) 202 via the network 214), located on the server device(s) 202, on third-party servers, and/or on the client device 210.

Figure 3:
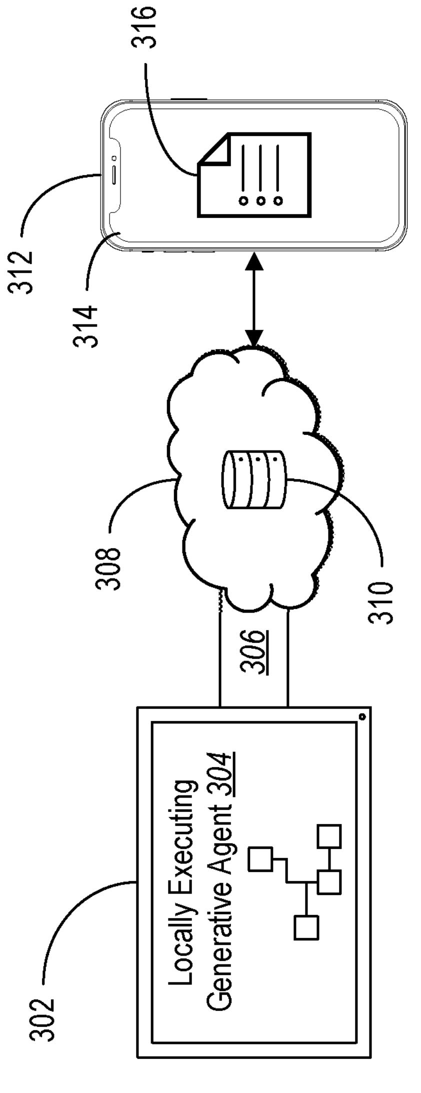
FIG. 3 illustrates an overview of the remotely controlling agentic system establishing a persistent bi-directional connection between an executing client device and a backend runtime service and utilizing a remote client device to monitor operations of a locally executing generative agent operating on the executing client device in accordance with one or more embodiments.

As mentioned, in some embodiments, the remotely controlling agentic system 120 can establish a persistent bi-directional connection between a client device and a backend runtime service. FIG. 3 illustrates the remotely controlling agentic system 120 establishing a persistent bi-directional connection and utilizing the persistent bi-directional connection to generate a mirrored task object based on executable tasks of a generative agent executing locally on the client device in accordance with one or more embodiments. Additional detail regarding the acts and processes introduced in relation to FIG. 3 is provided thereafter with reference to subsequent figures.

As shown in FIG. 3, the remotely controlling agentic system 120 can establish a persistent bi-directional connection 306 between a first client device 302 (e.g., an executing client device) and a backend runtime service 308, such as a service running on one or more servers that are remotely separated from the first client device 302. Indeed, the remotely controlling agentic system 120 can establish the persistent bi-directional connection 306 based on determining or otherwise identifying that a locally executing generative agent 304 is operating on the first client device 302. For example, the remotely controlling agentic system 120 can identify the locally executing generative agent 304 by identifying or otherwise determining that the locally executing generative agent operates directly on a local runtime of the first client device 302 (e.g., as opposed to a remotely hosted agent).

As shown in FIG. 3, the remotely controlling agentic system 120 can utilize the persistent bi-directional connection 306 to generate, at the backend runtime service 308, a mirrored task object 310. Indeed, the remotely controlling agentic system 120 can generate the mirrored task object 310 based on tasks executed or otherwise performed by the locally executing generative agent 304. For example, the remotely controlling agentic system 120 can generate the mirrored task object 310 to include executable tasks based on tasks that the remotely controlling agentic system 120 determines that the locally executing generative agent 304 performs on the first client device 302.

As illustrated in FIG. 3, the remotely controlling agentic system 120 can generate a visual representation 316 of the mirrored task object 310. The remotely controlling agentic system 120 can further provide the visual representation 316 for display on a remote agent control interface 314 of a second client device 312 (e.g., a remote control device). For example, the remotely controlling agentic system 120 can generate the visual representation 316 to include elements that correspond to executable tasks that the locally executing generative agent 304 performs on the first client device 302.

Further, based on detecting an interaction with the visual representation 316, the remotely controlling agentic system 120 can utilize the persistent bi-directional connection 306 to modify (in real time), operations of the locally executing generative agent 304 on the first client device 302. Additionally, the remotely controlling agentic system 120 can modify the persistent bi-directional connection 306 to include multiple client devices (e.g., to connect multiple executing client devices to the backend runtime service 308). The remotely controlling agentic system 120 can generate or otherwise modify the mirrored task object 310 based on executable tasks that the remotely controlling agentic system 120 identifies from the multiple client devices. Moreover, the remotely controlling agentic system 120 can utilize the (modified) persistent bi-directional connection 306 to distribute execution of tasks among the multiple client devices.

In some embodiments, the remotely controlling agentic system 120 utilizes the backend runtime service 308 to generate and relay the mirrored task object 310 to the second client device 312 (e.g., without storing the mirrored task object 310 at the backend runtime service 308). In some embodiments, the remotely controlling agentic system 120 establishes the persistent bi-directional connection 306 to be between the first client device 302 and the second client device 312. Accordingly, the remotely controlling agentic system 120 can host or otherwise generate the mirrored task object 310 on the second client device 312.

As previously mentioned, the remotely controlling agentic system 120 provides a variety of technical advantages relative to conventional systems. For example, the remotely controlling agentic system 120 improves operational flexibility relative to conventional systems by enabling remote deployment and/or supervision of the locally executing generative agent. Indeed, as opposed to the on-premises-only control paradigms implemented by conventional systems, the remotely controlling agentic system 120 establishes a persistent bi-directional connection between an executing client device hosting a locally executing generative agent and a backend runtime service to facilitate remote control and monitoring of a locally executing generative agent on an executing client device (separate from the monitoring/controlling device). Whereas conventional systems are limited to utilizing the executing client device to control operations of the locally executing generative agent, the remotely controlling agentic system 120 can utilize the persistent bi-directional connection to generate a mirrored task object that includes executable tasks performed by the locally executing generative agent. Further, the remotely controlling agentic system 120 can provide a visual representation of the mirrored task object for display on a remote client device, enabling remote supervision of the locally executing generative agent via the remote client device.

Further, the remotely controlling agentic system 120 improves operational flexibility relative to conventional systems by utilizing the persistent bi-directional connection and the mirrored task object to remotely cause the locally executing generative agent to perform modified tasks. Indeed, as opposed to conventional systems whose remote functions are limited to interaction with and supervision of virtual machines, the remotely controlling agentic system 120 can establish the persistent bi-directional connection to integrate with and remotely supervise and modify operations of a locally executing generative agent. Indeed, based on determining an indication of an interaction with the visual representation of the mirrored task object, the remotely controlling agentic system 120 can utilize the persistent bi-directional connection to modify (individual, turn-by-turn) operations of the locally executing generative agent, such as by causing the locally executing generative agent to modify performance of an executable task and/or causing the locally executing generative agent to abort performance of the executable task. Accordingly, by establishing the persistent bi-directional connection and utilizing the persistent bi-directional connection to generate the mirrored task object, the remotely controlling agentic system 120 enable remote devices to integrate with locally executing generative agent on a lifecycle-event level, enabling nuanced control and monitoring at levels beyond what conventional systems can provide for virtual machines or remote desktops.

Further, the remotely controlling agentic system 120 can improve operational flexibility relative to conventional systems by generating or otherwise modifying the persistent bi-directional connection to include multiple executing client devices and/or multiple remote control devices (e.g., in enterprise scenarios and/or collaborative multiplayer scenarios). Accordingly, not only does the remotely controlling agentic system 120 enable nuanced integration and control of a locally executing generative agent, but the remotely controlling agentic system 120 can expand the persistent bi-directional connection to enable remote supervision of multiple locally executing generative agents. Further, the remotely controlling agentic system 120 can utilize the persistent bi-directional connection to distribute executable tasks among multiple locally executing generative agents.

Figure 4:
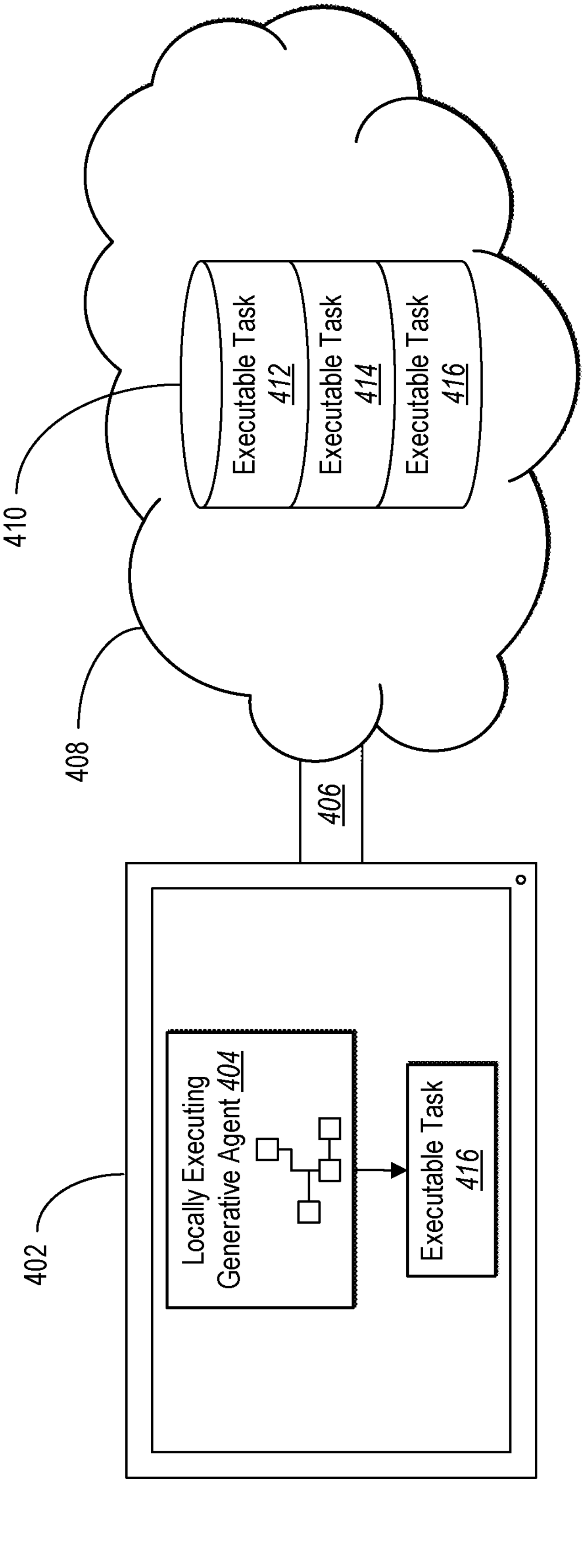
FIG. 4 illustrates the remotely controlling agentic system utilizing a persistent bi-directional connection to construct, at a backend runtime service, a mirrored task object based on executable tasks performed by a locally executing generative agent of an executing client device in accordance with one or more embodiments.

As previously mentioned, the remotely controlling agentic system 120 can establish a persistent bi-directional connection between a client device and a backend runtime service. FIG. 4 illustrates the remotely controlling agentic system 120 establishing the persistent bi-directional connection and utilizing the persistent bi-directional connection to generate a mirrored task object based on identifying executable tasks of a locally executing generative agent on the client device in accordance with one or more embodiments.

As illustrated in FIG. 4, the remotely controlling agentic system 120 can configure or otherwise identify a locally executing generative agent 404 on a client device 402 (e.g., an executing client device). As used herein, the term "locally executing generative agent" refers to an autonomous software program, such as a generative-model-driven agentic process or set of processes, that operates within a local runtime environment of the client device 402 (e.g., as opposed to a remotely managed execution environment, such as a cloud-managed environment). The locally executing generative agent 404 can integrate one or more generative models with execution capabilities on the client device. For example, the locally executing generative agent 404 can access, modify, or otherwise interact with locally stored files on the client device 402. Moreover, the locally executing generative agent 404 can invoke operating system interfaces on the client device, execute shell commands, and/or interact with network resources available to the client device 402. In some embodiments, the locally executing generative agent 404 includes a generative model.

To further elaborate, as used herein, the term "local" (and/or "locally," such as a locally executing generative agent or a local runtime environment") refers to a generative agent and/or a runtime environment that executes tasks. Indeed, the remotely controlling agentic system 120 can establish a persistent bi-directional connection to construct a mirrored task object based on executable tasks performed by a locally executing generative agent in a local runtime environment. Indeed, the locally executing generative agent can be the agent that performs operations within the local runtime environment. Along similar lines, as used herein, the term "remote" (such as a remote device or remotely separated") refers to a client device and/or operating environment that is separated from the locally executing generative agent and/or the local runtime environment, that supervises and/or modifies operations of the locally executing generative agent. Accordingly, remote devices monitor and/or modify operations of locally executing generative agents operating in local runtime environments.

Further, as used herein, the term "generative model" refers to a machine learning model that is configured to generate new data samples that are statistically consistent with the data on which the model was trained. Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs.

As used herein, the term "large language model" (or "LLM") refers to a computational model configured to process and generate human-readable text by learning statistical and contextual relationships within natural language data using machine learning techniques. An LLM typically comprises a deep neural network architecture, such as a transformer-based architecture with multiple layers and attention mechanisms, and is trained on large corpora of text using objectives such as masked language modeling, causal language modeling, or autoregressive prediction. The LLM may include billions or trillions of parameters and is capable of performing a variety of language tasks, including but not limited to text generation, summarization, translation, and question answering, by generating outputs based on input prompts in a contextually relevant manner.

Relatedly, the term "machine learning model" refers to a computational construct comprising one or more algorithms and associated parameters that are configured to perform tasks by identifying patterns or relationships within data. A machine learning model may be trained using supervised, unsupervised, semi-supervised, or reinforcement learning techniques, where the model parameters are adjusted based on input data to minimize a loss function or maximize a reward signal. The machine learning model may include, but is not limited to, neural networks (e.g., convolutional neural networks, recurrent neural networks, transformer models), decision trees, support vector machines, or ensemble models, and may be configured to perform tasks such as classification, regression, clustering, anomaly detection, or data generation. A machine learning model may operate on structured, unstructured, or multimodal data and may generate outputs that are used for predictions, decisions, or content generation based on learned representations of input data.

Additionally, the term "neural network" refers to a computational model comprising multiple interconnected processing elements, often referred to as neurons or nodes, that are organized into layers including an input layer, one or more hidden layers, and an output layer. Each neuron in the neural network applies a transformation, which may include a weighted sum of inputs followed by a non-linear activation function, to produce an output that is transmitted to subsequent neurons in the network. Neural networks are configured to learn representations of data by adjusting the weights and biases of the connections between neurons during a training process that minimizes a loss function. The neural network may include various architectures, including but not limited to feedforward neural networks, convolutional neural networks (CNNs), recurrent neural networks (RNNs), and transformer-based networks (e.g., LLMs), and may be utilized for tasks such as classification, regression, pattern recognition, natural language processing, and generative modeling across structured, unstructured, or multimodal data.

Similarly, as used herein, the term "local runtime environment" refers to a locally hosted computing environment on a client device that supports the instantiation and/or operation of a locally executing generative agent (e.g., the locally executing generative agent 404). The local runtime environment can include hardware and/or software components of the client device 402 that provide execution capabilities for locally instantiated software programs. For example, the local runtime environment can include an operating system context of the client device, system libraries, installed toolchains, configuration files, memory resources, processor resources, and/or network interfaces. In some embodiments, the local runtime environment includes a command line interface (CLI) session executing on the client device, such as a terminal session wherein a coding agent (such as Codex) is instantiated and operated. Indeed, the local runtime environment can refer to a logical environment that supports operations of a locally executing generative agent performing executable tasks on an executing device.

As shown in FIG. 4, the remotely controlling agentic system 120 can identify an executable task 416 that the locally executing generative agent 404 performs (e.g., within the local runtime environment of the client device 402). As used herein, the term "executable task" refers to a discrete operation (e.g., one or more computer processes or subroutines) that a locally executing generative agent 404 performs. The executable task 416 can be performed by the locally executing generative agent 404 in response to the locally executing generative agent 404 receiving an instruction and/or prompt (e.g., such as from a user account of the client device 402). In some embodiments, the locally executing generative agent 404 autonomously performs the executable task 416. To illustrate, the executable task 416 can include generating and/or modifying a file, invoking an operating system interface, executing a shell command, interacting with tools on the client device 402, and/or performing network-based operations available to the client device 402.

As illustrated in FIG. 4, the remotely controlling agentic system 120 can establish a persistent bi-directional connection 406 between the client device 402 and a backend runtime service 408. As used herein, the term "persistent bi-directional connection" refers to a continuously maintained network communication channel established between a local runtime environment of a client device and a backend runtime service. To illustrate, the persistent bi-directional connection 406 can enable continuous transmission of data between the local runtime environment of the client device 402 and the backend runtime service 408 (e.g., as opposed to re-establishing a connection between the local runtime environment and the backend runtime service for each data transmission). For example, the persistent bi-directional connection 406 can be an open transport session that supports streaming of data from the local runtime environment (e.g., the client device 402) to the backend runtime service concurrently with supporting streaming of data from the backend runtime service to the local runtime environment. Further, the persistent bi-directional connection 406 can support communication between a locally executing generative agent operating in the local runtime environment (e.g., the locally executing generative agent 404) and the backend runtime service. Moreover, the persistent bi-directional connection can operate in accordance with different communication protocols, such as a full-duplex communication protocol (e.g., a WebSocket connection), a persistent publish-subscribe messaging channel, webhook-based event streaming, a long-lived HTTP session, and/or other data transport mechanisms configured to maintain an open logical session for data streaming.

Further, as used herein, the term "backend runtime service" refers to a remotely hosted computing environment operating on one or more servers that are (physically) separated from the client device. Moreover, the backend runtime service 408 can be configured to support orchestration and management of interactions with the locally executing generative agent 404. For example, the backend runtime service 408 can be implemented within a cloud computing environment. Further, in some embodiments the backend runtime service 408 executes on shared or virtualized server infrastructure in accordance with a cloud computing model.

As shown in FIG. 4, the remotely controlling agentic system 120 can generate a mirrored task object 410. As used herein, the term "mirrored task object" refers to a structured data representation that corresponds to one or more executable tasks performed by a locally executing generative agent. Indeed, the mirrored task object 410 can model executable operations of the locally executing generative agent in a manner that preserves execution ordering, task boundaries, and associated state information to characterize progress and/or completion of the executable tasks. Further, the mirrored task object 410 can include structured lifecycle events of the locally executing generative agent 404. Specifically, the mirrored task object 410 can include the structured lifecycle events by describing an operation the locally executing generative agent 404 performs, such as by describing turn initiation data, turn completion data, prompt data, intermediate execution artifacts, tool invocation data, and/or other execution-related events. Indeed, the mirrored task object 410 can include specific task endpoints for executable tasks performed by the locally executing generative agent 404. Moreover, the mirrored task object 410 can be generated, hosted, stored, or otherwise instantiated within the backend runtime service 408. Additionally, the mirrored task object 410 can be stored, indexed, and retrievable to enable remote inspection and/or control of a task history of the locally executing generative agent 404.

As shown in FIG. 4, the remotely controlling agentic system 120 can generate the mirrored task object 410 to include previously instantiated and/or completed executable tasks of the locally executing generative agent 404, such as an executable task 412, an executable task 414, and the executable task 416. Indeed, the remotely controlling agentic system 120 can enable, via the persistent bi-directional connection 406, the locally executing generative agent 404 to continuously stream lifecycle events that correspond to execution states of executable tasks performed by the locally executing generative agent 404. The remotely controlling agentic system 120 can further utilize the backend runtime service 408 to receive the lifecycle events of the locally executing generative agent 404 and generate/modify the mirrored task object 410 from the lifecycle events. Indeed, the remotely controlling agentic system 120 can generate the mirrored task object 410 in real time (or near-real time) to be a remote representation of executable tasks that the locally executing generative agent 404 performs in the local runtime environment of the client device 402 in real time.

Further, the remotely controlling agentic system 120 can utilize the backend runtime service 408 to store local sessions of the locally executing generative agent 404 (e.g., instantiations of the locally executing generative agent 404 on the client device 402) as first-class tasks using a unified representation. In some embodiments, the remotely controlling agentic system 120 generates the mirrored task object 410 using the unified representation for improved compatibility and uniformity. Indeed, the remotely controlling agentic system 120 can implement a task representation compatible with, or the same as that which represents, operations of cloud-hosted generative agents, thus enabling operational compatibility between the locally executing generative agent 404 and cloud-hosted generative agents. For example, by generating the first-class tasks for sessions of the locally executing generative agent 404, the remotely controlling agentic system 120 can enable a remote client device to inspect full histories of operations of the locally executing generative agent 404, to replay worklogs of the locally executing generative agent 404, to render the session of the locally executing generative agent 404 in a chat interface of the remote client device, as well as enabling the remote client device to inject commands into the session of the locally executing generative agent 404.

Figure 5:
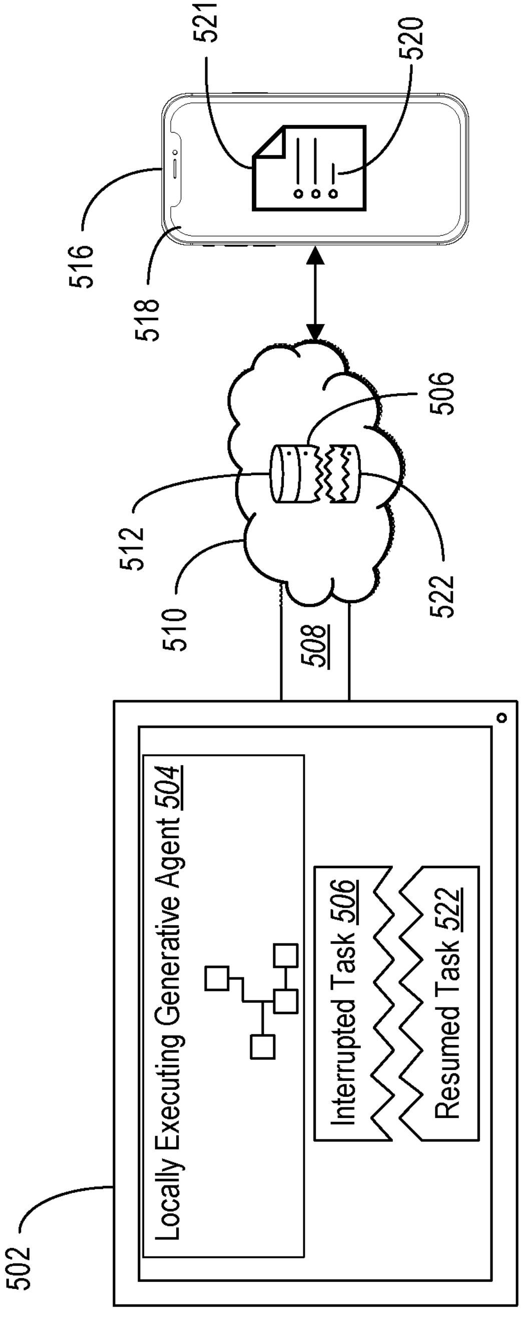
FIG. 5 illustrates the remotely controlling agentic system utilizing a persistent bi-directional connection to detect an interrupted task performed by a locally executing generative agent on an executing client device in accordance with one or more embodiments.

As previously mentioned, the remotely controlling agentic system 120 can identify an interrupted task at the local runtime environment. FIG. 5 illustrates the remotely controlling agentic system 120 identifying an interrupted task and modifying a mirrored task object and a visual representation of the mirrored task object based on identifying the interrupted task in accordance with one or more embodiments.

As shown in FIG. 5, the remotely controlling agentic system 120 can utilize a backend runtime service 510 to identify an interrupted task 506 of a locally executing generative agent 504 operating on a first client device 502 (e.g., an executing client device). For example, the remotely controlling agentic system 120 can detect the interrupted task 506 via a persistent bi-directional connection 508 between the first client device 502 and the backend runtime service 510. For example, the remotely controlling agentic system 120 can detect the interrupted task 506 by detecting an incomplete set of lifecycle events from the locally executing generative agent 504 that correspond to an executable task of the locally executing generative agent 504.

To illustrate, the remotely controlling agentic system 120 can cause the locally executing generative agent 504 to stream a set of lifecycle events (via the persistent bi-directional connection 508 to the backend runtime service 510) that correspond to an executable task. For example, the set of lifecycle events can include an executable task start event that corresponds to the locally executing generative agent 504 beginning an executable task, one or more intermediate task execution events that correspond to discrete intermediate events of the locally executing generative agent 504 performing the executable task, and a task completion event that corresponds to the locally executing generative agent 504 completing the executable task.

Indeed, the remotely controlling agentic system 120 can cause the locally executing generative agent 504 to stream the set of lifecycle events (e.g., task start event, the one or more intermediate task execution events, and the task completion event) to the backend runtime service 510 via the persistent bi-directional connection 508. Based on the backend runtime service 510 receiving the set of lifecycle events, the remotely controlling agentic system 120 can utilize the backend runtime service 510 to construct the mirrored task object 512 to include executable tasks based on sets of lifecycle events.

Accordingly, in some embodiments the remotely controlling agentic system 120 identifies the interrupted task 506 at the backend runtime service 510 based on determining that the backend runtime service 510 receives a partial (e.g., incomplete) set of lifecycle events corresponding to an executable task. For example, the remotely controlling agentic system 120 can determine that the backend runtime service 510 receives a task start event, one or more intermediate task execution events, but that the backend runtime service 510 does not receive a task completion event. Based on determining that the backend runtime service 510 does not receive a task completion event, the remotely controlling agentic system 120 can identify the interrupted task 506 on the first client device 502. Further, the remotely controlling agentic system 120 can modify a mirrored task object 512 to include the interrupted task 506.

In some embodiments, the remotely controlling agentic system 120 identifies or otherwise determines the interrupted task 506 at the backend runtime service 510 by identifying a disruption to the persistent bi-directional connection 508. For example, the remotely controlling agentic system 120 can identify the disruption by determining that the backend runtime service 510 is not receiving data from the first client device 502 via the persistent bi-directional connection 508. Further, the remotely controlling agentic system 120 can identify the disruption to the persistent bi-directional connection 508 by determining that the backend runtime service 510 does not receive data via the persistent bi-directional connection for a threshold period of time (e.g., such as a number of microseconds, a number of milliseconds, a number of seconds etc.)

As shown in FIG. 5, the remotely controlling agentic system 120 can provide a visual representation 521 of the mirrored task object 512 for display on a remote agent control interface 518 of a second client device 516 that is (physically) separated from the backend runtime service 510 and (physically) separated from the first client device 502. As used herein, the term "remote agent control interface" refers to a graphical user interface rendered on a remote client device. Further, the remote agent control interface 518 displays data corresponding to operations of a generative agent executing locally on a different client device (e.g., the locally executing generative agent 504 operating on the client device 502). Indeed, the remote agent control interface 518 can enable remote monitoring and/or remote control of the generative agent. Further, the remote agent control interface 518 can include elements that are configured and selectable to control or otherwise modify operations of the generative agent operating on the different client device, such as elements selectable to transmit prompt data, cancellation commands, executable task modification commands, among others, to the generative agent operating on the different client device.

Further, as used herein, the term "visual representation" (e.g., of a mirrored task object) refers to an element of a remote agent control interface that displays data corresponding to a mirrored task element. For example, the visual representation 521 can include elements that correspond to elements of the mirrored task object 512 (e.g., and that therefore correspond to executable tasks of the generative agent). For example, the visual representation 521 can include elements that are selectable to transmit data to a backend runtime service 510 to cause the backend runtime service 510 to modify operations of the generative agent via the persistent bi-directional connection 508.

As shown in FIG. 5, based on identifying the interrupted task 506, the remotely controlling agentic system 120 can modify the visual representation 521 of the mirrored task object 512 to include an element 520 that corresponds to the interrupted task 506. For example, the remotely controlling agentic system 120 can generate the element 520 to include an explanation of the interrupted task 506, such as by generating the element 520 to describe a level of completion of the executable task before the task was interrupted. Further, the remotely controlling agentic system 120 can generate the element 520 to describe options for resuming and/or completing the interrupted task 506.

As shown in FIG. 5, the remotely controlling agentic system 120 can identify, at the backend runtime service 510 via the persistent bi-directional connection 508, a resumed task 522. For example, the remotely controlling agentic system 120 can detect the resumed task 522 by receiving data, such as structured lifecycle event data, from the locally executing generative agent 504 via the persistent bi-directional connection 508. In some embodiments the remotely controlling agentic system 120 identifies the resumed task 522 based on determining that the locally executing generative agent 504 restarts an executable task that corresponds to the interrupted task 506 (e.g., such as by receiving a new set of lifecycle data that corresponds to the executable task). In some embodiments, the remotely controlling agentic system 120 identifies the resumed task 522 by receiving a remainder of the incomplete set of lifecycle events that correspond to the interrupted task 506.

As illustrated in FIG. 5, based on identifying the resumed task 522, the remotely controlling agentic system 120 can modify the mirrored task object 512 to include the resumed task 522. In some embodiments, the remotely controlling agentic system 120 modifies the mirrored task object 512 by merging the interrupted task 506 with the resumed task 522. In some embodiments, the remotely controlling agentic system 120 modifies the mirrored task object 512 by replacing the interrupted task 506 with the resumed task 522.

Figure 6:
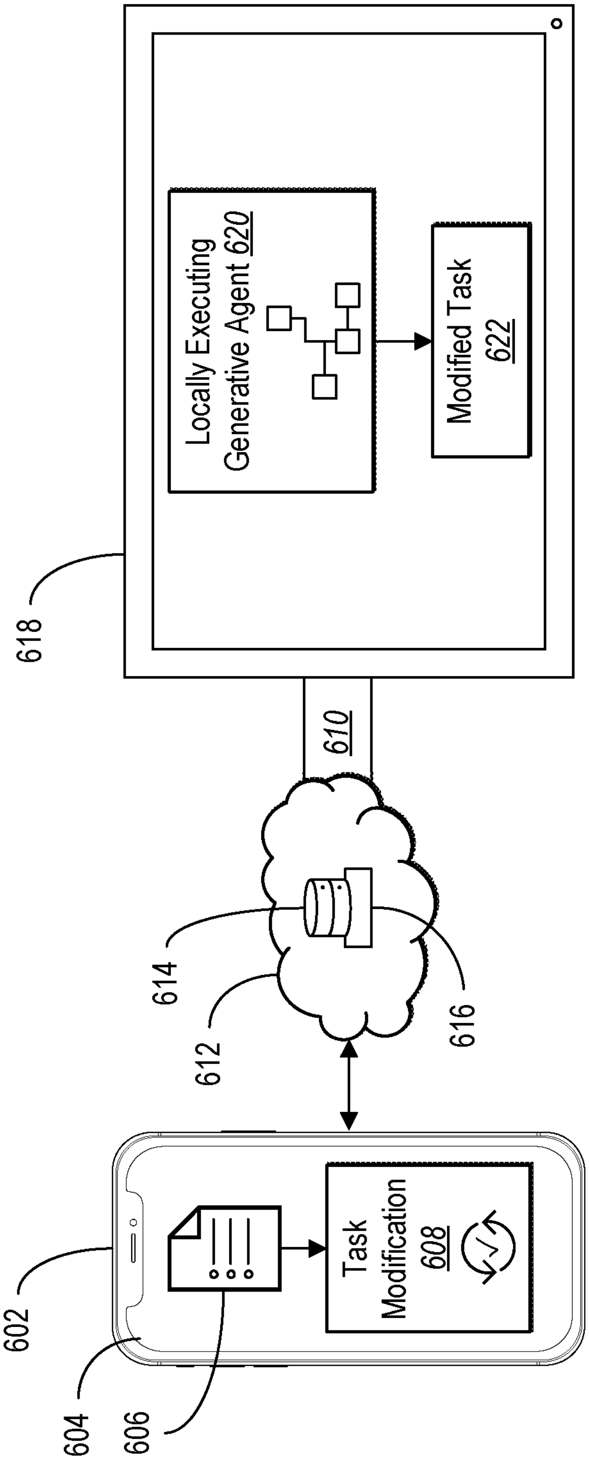
FIG. 6 illustrates the remotely controlling agentic system modifying operations of a locally executing generative agent operating on an executing client device based on determining an interaction with a visual representation of a mirrored task object on a remote device in accordance with one or more embodiments.

As previously mentioned, the remotely controlling agentic system 120 can utilize a persistent bi-directional connection to remotely modify operations of a generative agent. FIG. 6 illustrates the remotely controlling agentic system 120 remotely modifying operations of a generative agent based on determining an indication of an interaction with a visual representation of a mirrored task object in accordance with one or more embodiments.

As shown in FIG. 6 and as previously discussed, the remotely controlling agentic system 120 can display, within a remote agent control interface 604 of a client device 602 (e.g., a remote client device), a visual representation 606 of a mirrored task object 614. Indeed, the remotely controlling agentic system 120 can generate the visual representation 606 to include elements that correspond to executable tasks of the mirrored task object 614. Further, as previously discussed, the remotely controlling agentic system 120 can generate the mirrored task object 614 based on determining executable tasks performed by a locally executing generative agent 620 operating on a client device 618 (e.g., an executing client device).

As shown in FIG. 6, based on displaying the visual representation 606, the remotely controlling agentic system 120 can determine a task modification 608 (e.g., for the locally executing generative agent 620 operating on the client device 618). For example, the remotely controlling agentic system 120 can determine the task modification 608 based on receiving an indication of an interaction with the visual representation 606, such as a tap, swipe, or click via the remote agent control interface 604. In some embodiments, the remotely controlling agentic system 120 determines or otherwise identifies the indication of the interaction by receiving an input via the remote agent control interface 604, such as a prompt from a user account of the client device 602.

As shown in FIG. 6, based on identifying the task modification 608, the remotely controlling agentic system 120 can modify a corresponding element 616 of the mirrored task object 614. For example, based on identifying the task modification 608, the remotely controlling agentic system 120 can access or otherwise establish a connection with a backend runtime service 612 that stores the mirrored task object 614. Further, the remotely controlling agentic system 120 can identify the corresponding element 616 and modify the corresponding element 616 according to the task modification 608. To illustrate, the remotely controlling agentic system 120 can modify the corresponding element 616 by rewriting or otherwise modifying one or more of the life-cycle events of the corresponding element 616.

As shown in FIG. 6, based on modifying the corresponding element 616 of the mirrored task object 614, the remotely controlling agentic system 120 can cause the locally executing generative agent 620 to perform a modified task 622 (e.g., operating on the client device 618). To illustrate, based on modifying the corresponding element 616 of the mirrored task object 614, the remotely controlling agentic system 120 can provide a command to the locally executing generative agent 620 via a persistent bi-directional connection 610 (e.g., between the backend runtime service 612 and the client device 618). In some embodiments, the remotely controlling agentic system 120 modifies the corresponding element 616 to include the command. In some embodiments, the remotely controlling agentic system 120 autonomously provides the command via the persistent bi-directional connection 610 based on modifying the corresponding element 616.

Accordingly, through the remote agent control interface 604, the visual representation 606 of the mirrored task object 614, and the persistent bi-directional connection 610, the remotely controlling agentic system 120 can enable the client device 602 (e.g., the remote client device) to perform command injection on the locally executing generative agent 620 operating on the client device 618. Accordingly, the remotely controlling agentic system 120 can utilize the client device 602 to modify or otherwise control operations of the locally executing generative agent 620 operating on the client device 618. For example, based on determining the task modification 608, the remotely controlling agentic system 120 can cause the locally executing generative agent 620 to perform the modified task 622 by causing the locally executing generative agent 620 to abort an ongoing executable task. In some embodiments, the remotely controlling agentic system 120 causes the locally executing generative agent 620 to perform the modified task 622 by performing a new (or different) executable task.

In some embodiments, based on identifying the task modification 608, the remotely controlling agentic system 120 modifies the persistent bi-directional connection 610 by connecting, via the persistent bi-directional connection 610, the client device 602 and the backend runtime service 612, thus bypassing the backend runtime service 612. Indeed, by modifying the persistent bi-directional connection 610 to include the client device 602 (e.g., the remote client device) and/or to bypass the backend runtime service 612, the remotely controlling agentic system 120 can instantiate a remote control session to enable the client device 602 to modify executable tasks of the mirrored task object 614. Further, based on modifying the mirrored task object 614, the remotely controlling agentic system 120 can enable the client device 602 to control operations of the locally executing generative agent 620.

In some embodiments, based on identifying the task modification 608, the remotely controlling agentic system 120 modifies the persistent bi-directional connection 610 by connecting, via the persistent bi-directional connection 610, the client device 602 to the client device 618. By modifying the persistent bi-directional connection 610 to include the client device 602 and the client device 618, the remotely controlling agentic system 120 can instantiate a remote control session to enable the client device 602 (e.g., the remote client device) to directly modify operations of the locally executing generative agent 620 operating on the client device 618 (e.g., the executing client device). Indeed, the remotely controlling agentic system 120 can utilize the persistent bi-directional connection 610 to provide the task modification 608 directly to the locally executing generative agent 620 to cause the locally executing generative agent 620 to perform the modified task 622. Further, based on causing the locally executing generative agent 620 to perform the modified task 622, the locally executing generative agent 620 can update or otherwise modify the mirrored task object 614 to include or otherwise reflect the modified task 622.

Further, in some embodiments the remotely controlling agentic system 120 generates the remote agent control interface 604 to include a remote session instantiation element that is selectable to modify the persistent bi-directional connection 610 to include the client device 602 (e.g., by connecting the client device 602 via the persistent bi-directional connection 610 to the backend runtime service 612 and/or by connecting the client device 602 via the persistent bi-directional connection 610 to the client device 618). Based on determining an indication of an interaction with the remote session instantiation element, the remotely controlling agentic system 120 can instantiate the remote session by modifying the persistent bi-directional connection 610. Further, based on instantiating the remote session, the remotely controlling agentic system 120 can receive user account inputs via the remote agent control interface 604 and can remotely control operations of the locally executing generative agent 620 according to the user account inputs.

Figure 7:
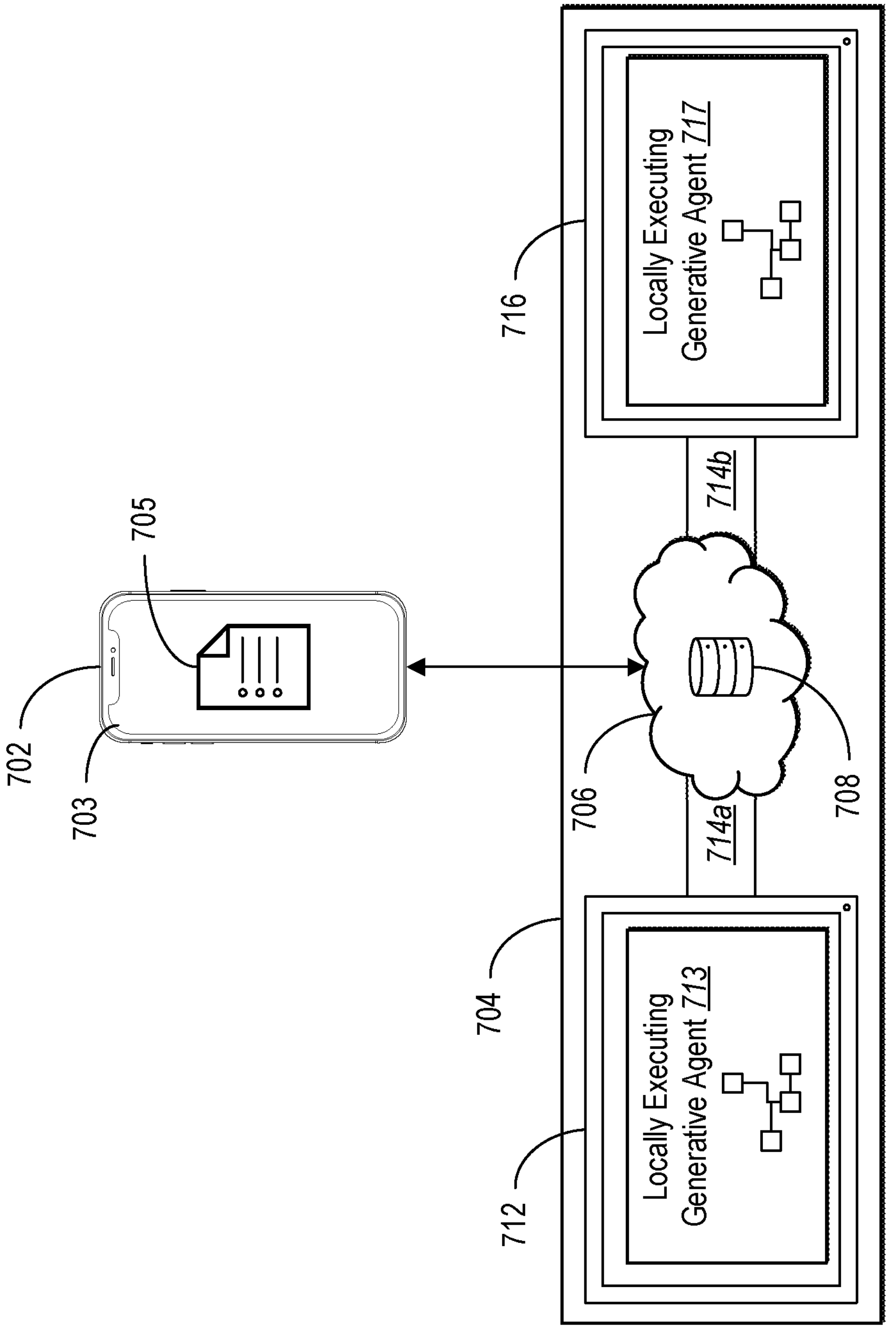
FIG. 7 illustrates the remotely controlling agentic system generating a mirrored task object based on operations of multiple locally executing generative agents operating on different executing client devices within an enterprise environment in accordance with one or more embodiments.

As previously mentioned, the remotely controlling agentic system 120 can establish an enterprise environment between multiple client devices. FIG. 7 illustrates the remotely controlling agentic system 120 establishing an enterprise environment and utilizing the enterprise environment to modify a mirrored task object based on executable tasks performed at the multiple client devices in accordance with one or more embodiments.

As shown in FIG. 7, the remotely controlling agentic system 120 can utilize a remote client device 702 to monitor and/or interact with an enterprise environment 704 that includes multiple executing client devices 712 and 716. As used herein, the term "enterprise environment" refers to a group of executing client devices that are associated with an enterprise account, such as a group of executing client devices within a shared logical environment. For example, the enterprise account can be a distributed account for an entity or organization. Further, the enterprise environment 704 can include a persistent bi-directional connection that connects the group of executing client devices (e.g., that are physically separated from each other) to a backend runtime service. In some embodiments, the enterprise environment 704 utilizes and/or modifies the persistent bi-directional connection simultaneously connects all of the executing client devices to the backend runtime service via the persistent bi-directional connection. In some embodiments, the enterprise environment 704 selects a subset of the group of executing client devices to connect to the backend runtime service via the persistent bi-directional connection. Further, the enterprise environment 704 can modify the executing client devices that are included in the subset. Accordingly, the enterprise environment 704 can facilitate coordination and/or distribution of executable tasks among independent locally executing generative agents operating in different runtime environments and operating on different executing client devices of the group (or subset) of executing client devices.

Indeed, as shown in FIG. 7, the remotely controlling agentic system 120 can structure the enterprise environment 704 to include an executing client device 712 that hosts a locally executing generative agent 713 and an executing client device 716 that hosts a locally executing generative agent 717. Further, the remotely controlling agentic system 120 can connect the executing client device 712 to a backend runtime service 706 utilizing a persistent bi-directional connection 714*a*. Additionally, the remotely controlling agentic system 120 can connect the executing client device 716 to the backend runtime service 706 via a persistent bi-directional connection 714*b*.

In some embodiments, the remotely controlling agentic system 120 instantiates the enterprise environment 704 based on determining that the executing client device 712, the executing client device 716, and the remote client device 702 all correspond to an enterprise account. In some embodiments, the remotely controlling agentic system 120 establishes the enterprise environment 704 by modifying the persistent bi-directional connection (e.g., 714*a*) to include an additional executing client device. For example, the remotely controlling agentic system 120 can establish the persistent bi-directional connection 714*a* between the executing client device 712 and the backend runtime service 706. The remotely controlling agentic system 120 can modify the persistent bi-directional connection 714*a* to include the executing client device 716 by establishing the persistent bi-directional connection 714*b* between the executing client device 716 and the backend runtime service 706. For example, the remotely controlling agentic system 120 can instantiate the persistent bi-directional connection 714*b* based on receiving an enterprise environment instantiation indication, such as by receiving a request from the remote client device 702 and/or the executing client device 712. Further, in some embodiments, the remotely controlling agentic system 120 can modify the persistent bi-directional connection 714*a* to include the additional executing client device (e.g., by instantiating the persistent bi-directional connection 714*b* to connect the executing client device 716 to the backend runtime service 706, thus instantiating the enterprise environment 704) based on requesting and/or receiving a confirmation that the additional executing client device corresponds to the enterprise account that is associated with the executing client device 712 and the remote client device 702.

As shown in FIG. 7, the remotely controlling agentic system 120 can utilize the backend runtime service 706 to generate, host, and/or otherwise modify a mirrored task object 708. Indeed, the remotely controlling agentic system 120 can generate the mirrored task object 708 to include executable tasks performed by the locally executing generative agent 713 and executable tasks performed by the locally executing generative agent 717. Indeed, based on instantiating the enterprise environment 704, the remotely controlling agentic system 120 can modify the mirrored task object 708 to be an enterprise environment mirrored task object that stores executable tasks from different locally executing generative agents within the enterprise environment 704.

Further, as shown in FIG. 7, the remotely controlling agentic system 120 can provide, for display on a remote agent control interface 703 of the remote client device 702, a visual representation 705 of the mirrored task object 708 (e.g., of the enterprise environment). Indeed, the remotely controlling agentic system 120 can generate the visual representation 705 to include elements that correspond to different executable tasks performed by locally executing generative agents within the enterprise environment 704. Further, the remotely controlling agentic system 120 can generate the elements to include device descriptors that indicate which locally executing generative agent of the enterprise environment 704 performed the corresponding executable task.

Further, based on determining an indication of an interaction within the remote agent control interface 703 (e.g., such as a click, tap, swipe, or a receipt of an input from a user account and/or the enterprise account), the remotely controlling agentic system 120 can modify operations of locally executing generative agents within the enterprise environment 704. For example, the remotely controlling agentic system 120 can identify an indication of an interaction with an element of the visual representation 705. Based on identifying the indication of the interaction, the remotely controlling agentic system 120 can determine a modified task for a locally executing generative agent of the enterprise environment 704 to perform.

Further, in some embodiments, the remotely controlling agentic system 120 selects, based on the indication of the interaction, a specific locally executing generative agent of the enterprise environment 704 to perform the modified task. For example, the remotely controlling agentic system 120 can determine that the indication of the interaction indicates the specific locally executing generative agent, such as by receiving an instruction (e.g., a prompt) via the remote agent control interface 703 that indicates the specific locally executing generative agent. In some embodiments, the remotely controlling agentic system 120 determines the specific locally executing generative agent based on determining an indication of an interaction with a locally executing generative agent selector element that corresponds to the specific locally executing generative agent.

In some embodiments, the remotely controlling agentic system 120 utilizes the enterprise environment 704 to autonomously orchestrate completion of an executable task (or a series of executable tasks). For example, the remotely controlling agentic system 120 can receive, via the remote agent control interface 703, an instruction to instantiate or otherwise utilize the enterprise environment 704 to perform the executable tasks. In some embodiments, the remotely controlling agentic system 120 identifies the executing client device 712 (and the locally executing generative agent 713) and the executing client device 716 (and the locally executing generative agent 717) based on receiving the instruction. In some embodiments, the remotely controlling agentic system 120 autonomously identifies the executing client device 712 (and the locally executing generative agent 713) and the executing client device 716 (and the locally executing generative agent 717) based on data associated with the enterprise account. For example, the remotely controlling agentic system 120 can utilize the persistent bi-directional connection 714*a* and 714*b* to synchronize execution states of executable tasks across executing devices of the enterprise environment 704.

Further, based on receiving the instruction, the remotely controlling agentic system 120 can instantiate or otherwise utilize the enterprise environment 704. Specifically, the remotely controlling agentic system 120 can utilize the backend runtime service 706 to assign the executable task to an executing client device of the enterprise environment 704. For example, the remotely controlling agentic system 120 can select the executing client device 712 based on determining an availability (e.g., such as a connectivity indicator) of the executing client device 712. The remotely controlling agentic system 120 can utilize the locally executing generative agent 713 to perform the executable task and modify or otherwise update the mirrored task object 708 based on performing the executable task. Moreover, based on receiving an indication from the remote client device 702 and/or the executing client device 712, the remotely controlling agentic system 120 can transfer the executable task to the locally executing generative agent 717 and modify the mirrored task object based 708 on operations of the locally executing generative agent 717.

In some embodiments, the remotely controlling agentic system 120 determines which locally executing generative agent of the enterprise environment 704 to utilize to perform the executable task. For example, the remotely controlling agentic system 120 can identify capability indicators of locally executing generative agents of the enterprise environment 704. To illustrate, the remotely controlling agentic system 120 can access metadata of locally executing generative agents of the enterprise environment 704 to determine performance metrics for each locally executing generative agent in specific task domains (e.g., that correspond to types of executable tasks). The remotely controlling agentic system 120 can determine a locally executing generative agent within the enterprise environment 704 based on determining that a performance metric for the locally executing generative agent meets a performance metric threshold for a task domain that corresponds to the executable task.

Further, the remotely controlling agentic system 120 determines which locally executing generative agent of the enterprise environment 704 to utilize to perform the executable task based on operational indicators of an executing client device that hosts the locally executing generative agent. For example, the remotely controlling agentic system 120 can identify operational indicators of executing client devices associated with each locally executing generative agent of the enterprise environment 704. To illustrate, the remotely controlling agentic system 120 can access metadata of executing client devices within the enterprise environment 704 to determine operational indicators for each executing client device, such as processor utilization, available processor capacity, memory utilization, available memory capacity, network bandwidth, storage utilization, among other measurable operational indicators of executing client devices within the enterprise environment 704. Indeed, the remotely controlling agentic system 120 can select a locally executing generative agent within the enterprise environment 704 based on determining that an operational indicator of a corresponding executing client device meets an operational threshold that corresponds to the executable task. Further, in some embodiments the remotely controlling agentic system 120 selects the locally executing generative agent from within the enterprise environment 704 based on determining that a performance metric for the locally executing generative agent meets a performance metric threshold and based on determining that an operational indicator of the corresponding executing client device meets the operational threshold.

Figure 8:
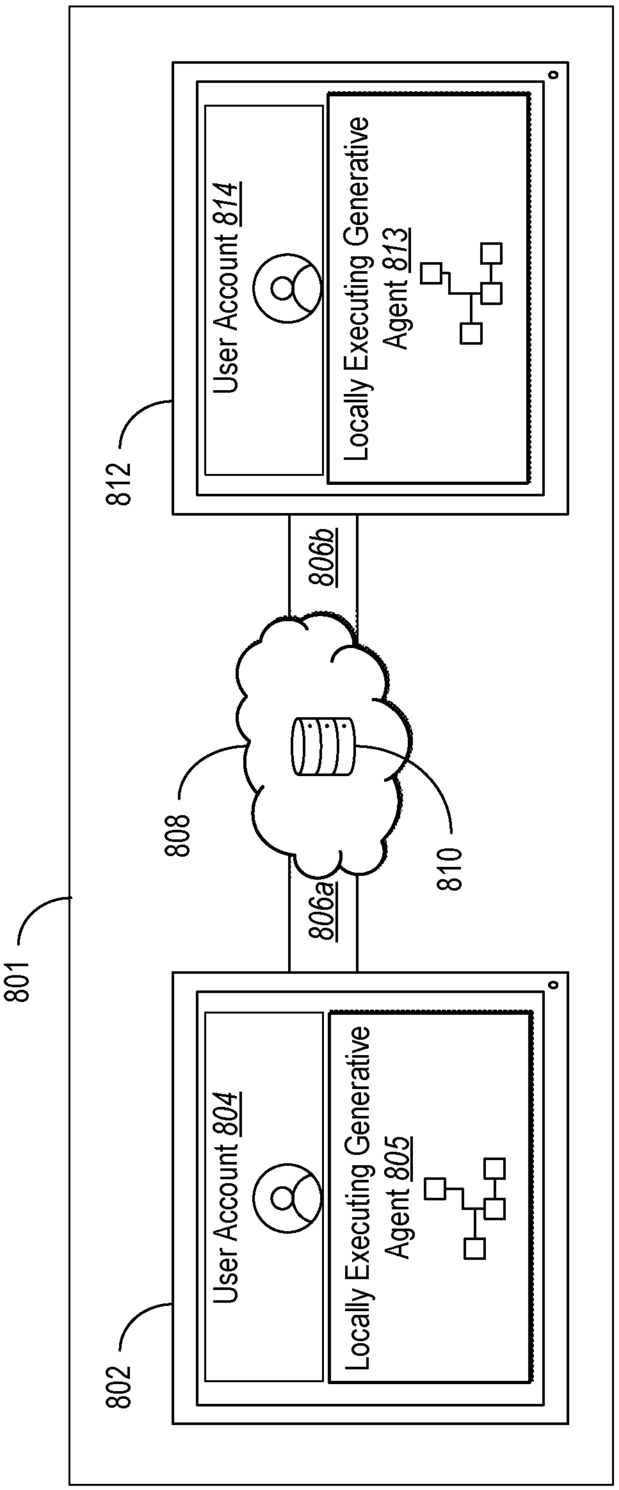
FIG. 8 illustrates the remotely controlling agentic system generating a mirrored task object based on operations of multiple locally executing generative agents operating on different executing client devices within a multi-user-account environment in accordance with one or more embodiments.

As previously mentioned, the remotely controlling agentic system 120 can establish a multi-user-account connection between a backend service and executing client devices that correspond to different user accounts. FIG. 8 illustrates the remotely controlling agentic system 120 identifying a multi-user-account environment by establishing a multi-user-account connection between multiple executing client devices in accordance with one or more embodiments.

As shown in FIG. 8, the remotely controlling agentic system 120 can identify a multi-user-account environment 801 that includes an executing client device 802 that corresponds to a user account 804 and an executing client device 812 that corresponds to a user account 814. The multi-user-account environment 801 can include a locally executing generative agent 805 that operates on a local runtime environment of the executing client device 802. Further, the multi-user-account environment 801 can include a locally executing generative agent 813 that operates on a local runtime environment of the executing client device 812. Further, as shown in FIG. 8, the remotely controlling agentic system 120 can establish a persistent multi-user-account connection 806*a* and 806*b* (e.g., a modified persistent bi-directional connection) to connect the executing client device 802 and the executing client device 812, respectively, to a backend runtime service 808.

As utilized herein, the term "multi-user-account connection" refers to a persistent bi-directional connection that the remotely controlling agentic system 120 modifies to include multiple executing client devices that correspond to different user accounts. Further, as used herein, the term "multi-user-account environment" refers to a group of executing client devices that correspond to different user accounts. Further, the group of executing client devices can be remotely separated from each other. In some embodiments, the multi-user-account environment 801 includes an enterprise environment and at least one additional executing client device that corresponds to a different user account than the user account that corresponds to the enterprise environment. In some embodiments, the multi-user-account connection 806*a* and 806*b* includes multiple enterprise environments.

As illustrated in FIG. 8, the remotely controlling agentic system 120 can generate and/or otherwise host a mirrored task object 810 on the backend runtime service 808. Indeed, the remotely controlling agentic system 120 can utilize the persistent multi-user-account connection 806*a* and 806*b* to update the mirrored task object 810 based on executable tasks that the locally executing generative agent 805 performs and based on executable tasks that the locally executing generative agent 813 performs. Moreover, based on utilizing the persistent multi-user-account connection 806*a* and 806*b* to identify executable tasks performed by the locally executing generative agent 805 and the locally executing generative agent 813, the remotely controlling agentic system 120 can generate the mirrored task object 810 to include a locally executing generative agent indicator that indicates which locally executing generative agent of the multi-user-account environment 801 performed the executable task. Further, the remotely controlling agentic system 120 can generate the mirrored task object 810 to include a user account indicator and/or an executing client device indicator that indicate a user account and/or executing client device associated with the executable task.

Moreover, the remotely controlling agentic system 120 can utilize a remote client device to manage the multi-user-account environment 801. For example, the remotely controlling agentic system 120 can cause the remote client device to display a visual representation of the mirrored task object 810 on a remote agent control interface. Further, in response to detecting an indication of an interaction with the visual representation, the remotely controlling agentic system 120 can cause a locally executing generative agent of the multi-user-account environment 801 to perform an executable task.

Accordingly, the remotely controlling agentic system 120 can utilize the multi-user-account environment 801 to remotely supervise and remotely distribute executable tasks among different user accounts and corresponding executing client devices of the multi-user-account environment 801. For example, the remotely controlling agentic system 120 can utilize the remote client device and the persistent multi-user-account connection 806*a* and 806*b* to distribute a first executable task to the locally executing generative agent 805 and a second executable task to the locally executing generative agent 813.

Further, the remotely controlling agentic system 120 can utilize the multi-user-account environment 801 and/or an enterprise environment (e.g., discussed above with regard to FIG. 7) to perform operations of the remotely controlling agentic system 120 in parallel. For example, the remotely controlling agentic system 120 can cause a first locally executing generative agent to perform a first executable task in conjunction with (e.g., in parallel with) causing a second locally executing generative agent to perform a second executable task. Further, the remotely controlling agentic system 120 can utilize the persistent multi-user-account connection 806*a* and 806*b* (and/or a persistent bi-directional connection) to simultaneously receive structured lifecycle data corresponding to executable tasks from different executing client devices within the multi-user-account environment 801 and/or the enterprise environment. Further, the remotely controlling agentic system 120 can simultaneously receive structured lifecycle data from a locally executing generative agent of a first executing client device and modify operations of a locally executing generative agent of a second executing client device.

Figure 10:
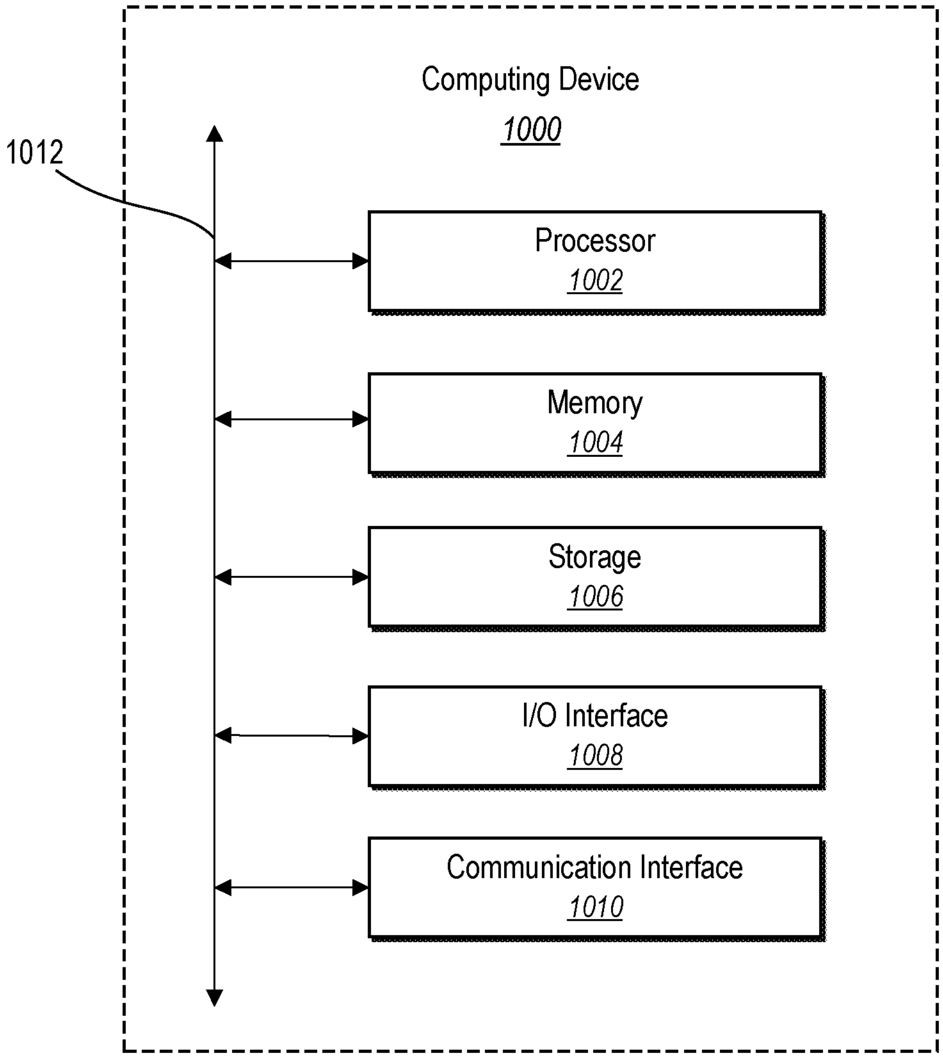
FIG. 10 illustrates a block diagram of an example computing device for implementing one or more embodiments of the present disclosure.

FIGS. 1-8, the corresponding text, and the corresponding examples provide a number of different methods, systems, devices, and non-transitory computer-readable media of the remotely controlling agentic system 120. In addition to the foregoing, one or more embodiments are described in terms of flowcharts comprising acts for accomplishing a particular result, as shown in FIG. 10. In some implementations, the processes of the remotely controlling agentic system 120 are performed with more or fewer acts. Furthermore, in various implementations, the acts are performed in differing orders. Additionally, in some implementations, the acts described herein are repeated or performed in parallel with one another or in parallel with different instances of the same or similar acts.

Figure 9:
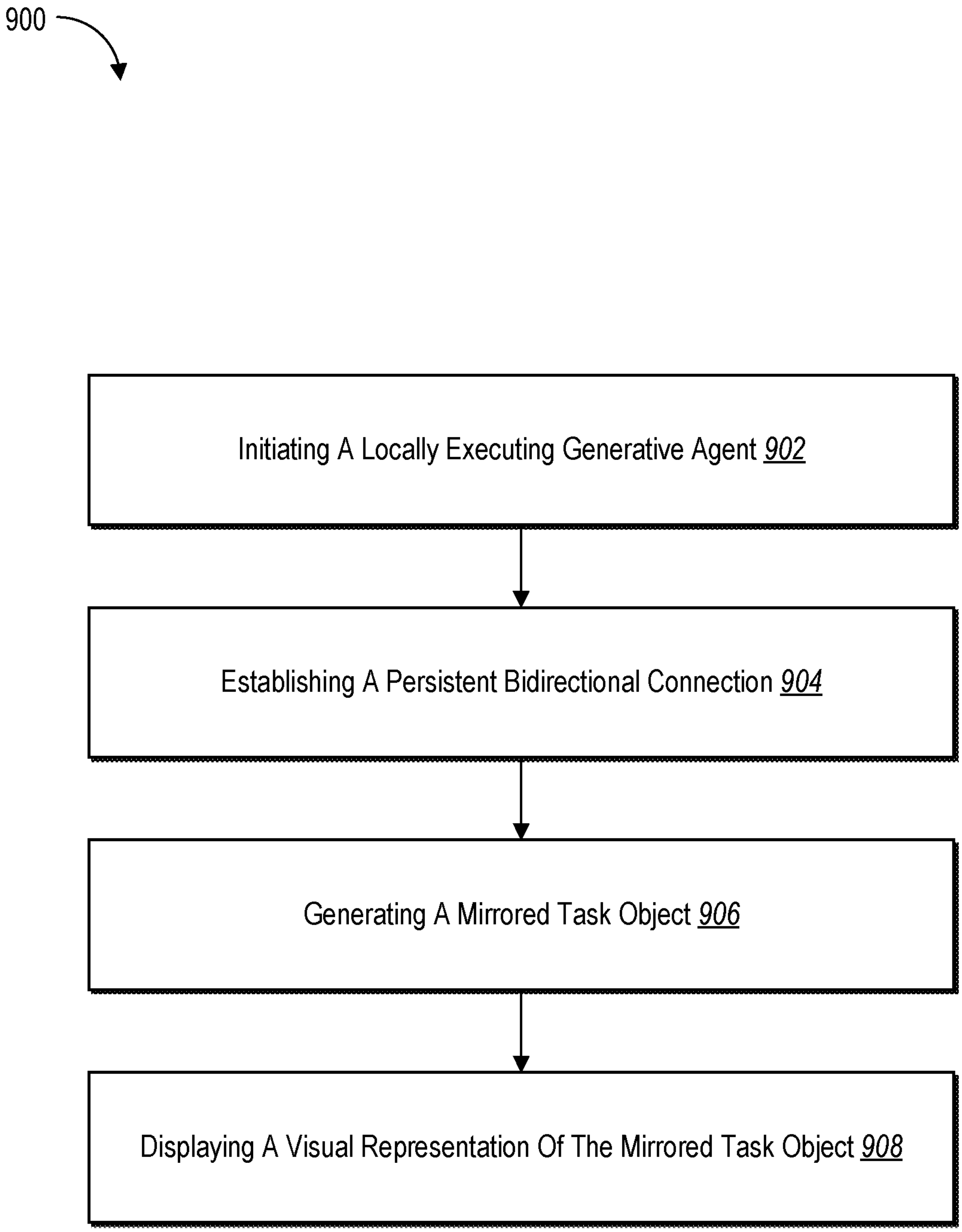
FIG. 9 illustrates a flowchart of a series of acts for generating a mirrored task object at a backend runtime service in accordance with one or more embodiments.

As mentioned, FIG. 9 illustrates a flowchart of a series of acts 900 for generating a mirrored task object. While FIG. 9 illustrates acts according to one implementation, alternative implementations may omit, add to, reorder, and/or modify any of the acts shown in FIG. 9. In one or more implementations, the acts of FIG. 9 are performed as part of a method (e.g., a computer-implemented method). Alternatively, in one or more embodiments, a non-transitory computer-readable storage medium comprises instructions that, when executed by the one or more processors, cause a computing device to perform the acts of FIG. 9. In some embodiments, a system performs the acts of FIG. 9.

As shown in FIG. 9, the series of acts 900 includes an act 902 of initiating a locally executing generative agent, an act 904 of establishing a persistent bi-directional connection, an act 906 of generating a mirrored task object, and an act 908 of displaying a visual representation of the mirrored task object.

For example, the series of acts 900 can include acts to perform any of the operations described in the following clauses:

CLAUSE 1. A computer-implemented method comprising:

initiating, at a first client device, a locally executing generative agent running in a local runtime environment on the first client device;

establishing a persistent bi-directional connection between the local runtime environment and a backend runtime service running on one or more server devices remotely separated from the first client device;

generating, at the backend runtime service through the persistent bi-directional connection, a mirrored task object comprising executable tasks of the locally executing generative agent running in the local runtime environment; and generating, for display on a second client device interfacing with the backend runtime service and remotely separated from the one or more server devices, a remote agent control interface displaying a visual representation of one or more executable tasks of the mirrored task object.

CLAUSE 2. The computer-implemented method of clause 1, wherein generating the mirrored task object comprises:

detecting, via the persistent bi-directional connection between the local runtime environment and the backend runtime service, instantiation of an executable task by the locally executing generative agent on the first client device; and mirroring the executable task from the locally executing generative agent to the backend runtime service on the one or more server devices.

CLAUSE 3. The computer-implemented method of any of clauses 1-2, further comprising:

detecting, at the backend runtime service, an interruption of an executable task performed by the locally executing generative agent in the local runtime environment; and providing an indication of the interruption via the remote agent control interface on the second client device.

CLAUSE 4. The computer-implemented method of any of clauses 1-3, further comprising:

detecting, at the backend runtime service, a resumption of execution of the executable task performed by the locally executing generative agent;

modifying the mirrored task object based on detecting the resumption of execution of the executable task; and modifying, for display on the second client device, the visual representation of the one or more executable tasks of the mirrored task object based on modifying the mirrored task object.

CLAUSE 5. The computer-implemented method of any of clauses 1-4, further comprising:

receiving, from the second client device via the remote agent control interface, an interaction with the visual representation of the mirrored task object;

based on receiving the interaction, determining a modification to the executable tasks of the locally executing generative agent; and instructing, via the persistent bi-directional connection, the locally executing generative agent to modify execution of the executable tasks according to the interaction.

CLAUSE 6. The computer-implemented method of any of clauses 1-5, further comprising:

identifying an enterprise environment for the locally executing generative agent by identifying a plurality of client devices that correspond to a user account of the first client device;

modifying the persistent bi-directional connection to include the plurality of client devices and the first client device; and distributing, utilizing the persistent bi-directional connection, execution of the executable tasks among the plurality of client devices.

CLAUSE 7. The computer-implemented method of any of clauses 1-6, further comprising terminating execution of executable tasks of the locally executing generative agent at the first client device based on receiving an interaction with the visual representation of the one or more executable tasks of the mirrored task object.

CLAUSE 8. The computer-implemented method of any of clauses 1-7, further comprising:

identifying an enterprise environment for the locally executing generative agent by identifying a plurality of client devices that correspond to a user account of the first client device; and establishing the persistent bi-directional connection by connecting the plurality of client devices and the first client device to the backend runtime service.

CLAUSE 9. The computer-implemented method of any of clauses 1-8, further comprising:

identifying a multi-user-account environment that comprises a user account that corresponds to the first client device, a plurality of additional user accounts that correspond to the user account, and a plurality of additional client devices that correspond to the plurality of additional user accounts;

establishing a persistent multi-user-account connection between the first client device and the plurality of additional client devices; and generating the mirrored task object based on identifying, via the persistent multi-user-account connection, a plurality of executable tasks that correspond to the first client device and the plurality of additional client devices.

CLAUSE 10. The computer-implemented method of any of clauses 1-9, wherein the executable tasks of the locally executing generative agent comprise utilizing a generative model to generate generative outputs.

CLAUSE 11. A system comprising:

at least one processor; and at least one non-transitory computer-readable storage medium storing instructions that, when executed by the at least one processor, cause the system to:

initiate, at a first client device, a locally executing generative agent running in a local runtime environment on the first client device;

establish a persistent bi-directional connection between the local runtime environment and a backend runtime service running on one or more server devices remotely separated from the first client device;

generate a mirrored task object comprising executable tasks of the locally executing generative agent running in the local runtime environment based on receiving, at the backend runtime service, structured lifecycle events via the persistent bi-directional connection; and generate, for display on a second client device interfacing with the backend runtime service and remotely separated from the one or more server devices, a remote agent control interface displaying a visual representation of one or more executable tasks of the mirrored task object.

CLAUSE 12. The system of clause 11, further comprising instructions that, when executed by the at least one processor, cause the system to:

detect, via the persistent bi-directional connection between the local runtime environment and the backend runtime service, a structured lifecycle event by detecting instantiation of an executable task by the locally executing generative agent on the first client device; and mirror the executable task from the locally executing generative agent to the backend runtime service on the one or more server devices.

CLAUSE 13. The system of any of clauses 10-11, further comprising instructions that, when executed by the at least one processor, cause the system to:

detect, at the backend runtime service, an incomplete lifecycle event by detecting an interruption of an executable task performed by the locally executing generative agent in the local runtime environment; and provide an indication of the interruption via the remote agent control interface on the second client device.

CLAUSE 14. The system of any of clauses 11-13, further comprising instructions that, when executed by the at least one processor, cause the system to:

detect, at the backend runtime service, a resumed lifecycle event by detecting a resumption of execution of the executable task performed by the locally executing generative agent;

modify the mirrored task object based on detecting the resumption of execution of the executable task; and modify, for display on the second client device, the visual representation of the one or more executable tasks of the mirrored task object based on modifying the mirrored task object.

CLAUSE 15. The system of any of clauses 11-14, further comprising instructions that, when executed by the at least one processor, cause the system to:

receive, from the second client device via the remote agent control interface, an interaction with the visual representation of the mirrored task object;

based on receiving the interaction, determine a modification to the executable tasks of the locally executing generative agent; and instruct, via the persistent bi-directional connection, the locally executing generative agent to modify execution of the executable tasks according to the interaction.

CLAUSE 16. A non-transitory computer-readable medium storing instructions that, when executed by at least one processor, cause a computing device to perform operations comprising:

initiating, at a first client device, a locally executing generative agent running in a local runtime environment on the first client device;

establishing a persistent bi-directional connection between the local runtime environment and a backend runtime service running on one or more server devices remotely separated from the first client device;

generating, at the backend runtime service through the persistent bi-directional connection, a mirrored task object comprising executable tasks of the locally executing generative agent running in the local runtime environment;

generating, for display on a second client device interfacing with the backend runtime service and remotely separated from the one or more server devices, a remote agent control interface displaying a visual representation of one or more executable tasks of the mirrored task object; and instructing, at the backend service, the locally executing generative agent to modify an executable task based on receiving, from the second client device via the remote agent control interface, an interaction with the visual representation of the mirrored task object.

CLAUSE 17. The non-transitory computer-readable medium of clause 16, wherein the operations further comprise:

detecting, via the persistent bi-directional connection between the local runtime environment and the backend runtime service, instantiation of an executable task by the locally executing generative agent on the first client device; and mirroring the executable task from the locally executing generative agent to the backend runtime service on the one or more server devices.

CLAUSE 18. The non-transitory computer-readable medium of any of clauses 16-17, wherein the operations further comprise:

identifying an enterprise environment for the locally executing generative agent by identifying a plurality of client devices that correspond to a user account of the first client device; and establishing the persistent bi-directional connection by connecting the plurality of client devices and the first client device to the backend runtime service.

CLAUSE 19. The non-transitory computer-readable medium of any of clauses 16-18, wherein the operations further comprise terminating execution of executable tasks of the locally executing generative agent at the first client device based on receiving an interaction with the visual representation of the one or more executable tasks of the mirrored task object.

CLAUSE 20. The non-transitory computer-readable medium of any of clauses 16-19, wherein the operations further comprise identifying a multi-user-account environment that comprises a user account that corresponds to the first client device, a plurality of additional user accounts that correspond to the user account, and a plurality of additional client devices that correspond to the plurality of additional user accounts;

establishing a persistent multi-user-account connection between the first client device and the plurality of additional client devices; and generating the mirrored task object based on identifying, via the persistent multi-user-account connection, a plurality of executable tasks that correspond to the first client device and the plurality of additional client devices.

Embodiments of the present disclosure may comprise or utilize a special purpose or general purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some implementations, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network computers, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

FIG. 10 illustrates a block diagram of an example computing device 1000 that may be configured to perform one or more of the processes described above. One will appreciate that one or more computing devices, such as the computing device 1000, may represent the computing devices described above (e.g., the server device(s) 202, the client device 210, etc.). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor 1002 includes hardware for executing instructions, such as those making up a computer program. As an example, and not by way of limitation, to execute instructions, the processor 1002 may retrieve (or fetch) the instructions from an internal register, an internal cache, memory 1004, or a storage device 1006 and decode and execute them.

The computing device 1000 includes the memory 1004, which is coupled to the processor 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes the storage device 1006 for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, a keypad, a keyboard, a touch screen, a camera, an optical scanner, a network interface, a modem, other known I/O devices, or a combination of such I/O interfaces.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include the bus 1012. The bus 1012 can include hardware, software, or both that connects components of computing device 1000 to each other.

Figure 11:
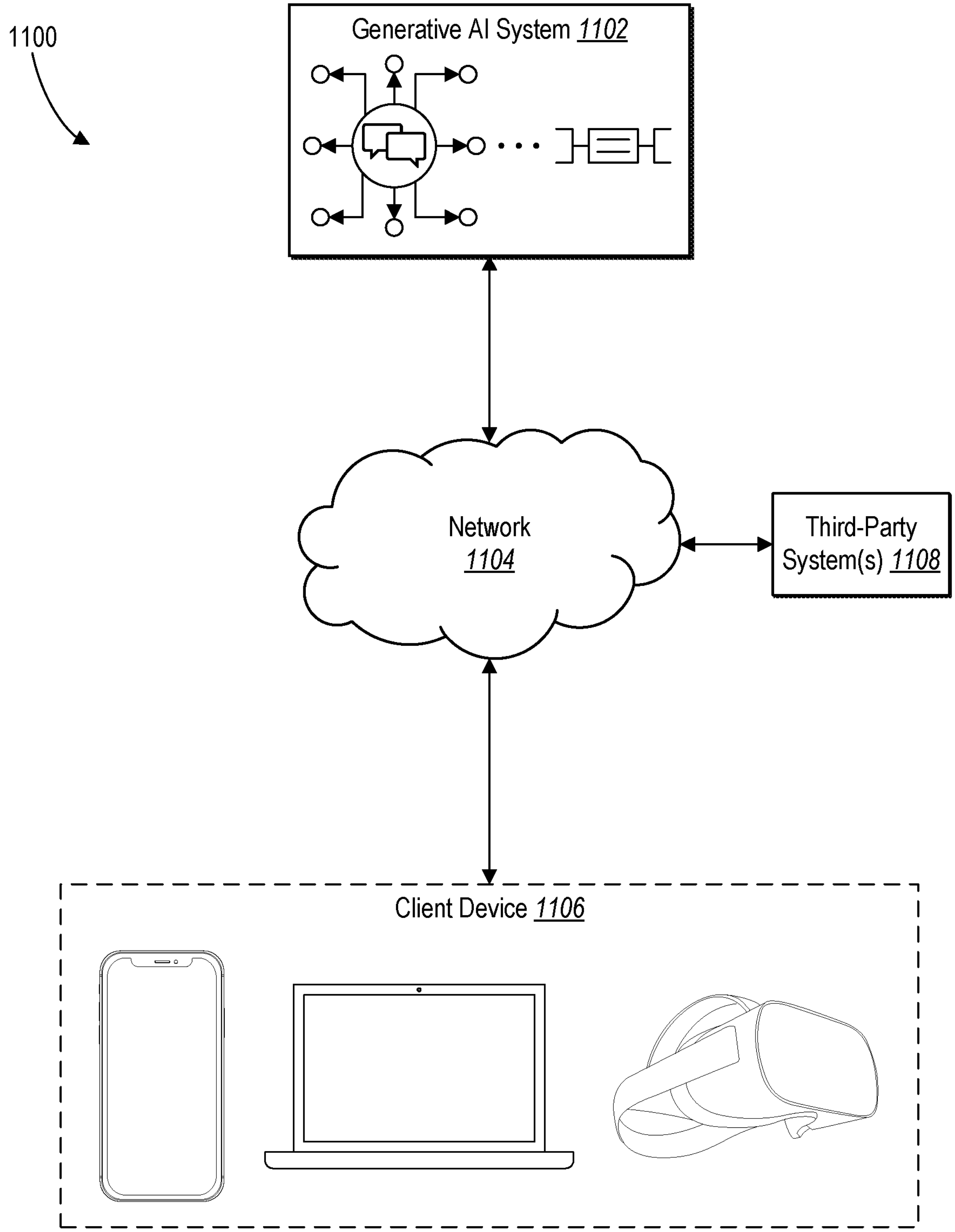
FIG. 11 illustrates a network environment of a generative artificial intelligence system in accordance with one or more embodiments.

FIG. 11 is a schematic diagram illustrating environment 1100 within which one or more implementations of the remotely controlling agentic system 120 can be implemented. For example, the remotely controlling agentic system 120 may be part of a generative AI system 1102 (e.g., the generative AI system 100). Generative AI system 1102 may generate, store, manage, receive, and send digital content (such as digital content items). For example, generative AI system 1102 may send and receive digital content to and from client devices 1106 by way of network 1104. In particular, generative AI system 1102 can store and manage a collection of digital content. Generative AI system 1102 can manage the sharing of digital content between computing devices associated with a plurality of users. For instance, generative AI system 1102 can facilitate a user sharing a digital content item with another user of generative AI system 1102.

In particular, generative AI system 1102 can manage synchronizing digital content across multiple client devices 1106 associated with one or more users. For example, a user may edit digital content using client device 1106. The generative AI system 1102 can cause client device 1106 to send the edited digital content to generative AI system 1102. Generative AI system 1102 then synchronizes the edited digital content on one or more additional computing devices.

In addition to synchronizing digital content across multiple devices, one or more implementations of generative AI system 1102 can provide an efficient storage option for users that have large collections of digital content. For example, generative AI system 1102 can store a collection of digital content on generative AI system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from generative AI system 1102. In particular, upon a user selecting a reduced-sized version of digital content, client device 1106 sends a request to generative AI system 1102 requesting the digital content associated with the reduced-sized version of the digital content. Generative AI system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access generative AI system 1102.

As illustrated, the generative AI system 1102 communicates with third-party system(s) 1108 by way of the network 1104. For example, the generative AI system 1102 generates computer code or scripts for execution by the third-party system(s) 1108 as part of generating an output. In some cases, the generative AI system 1102 integrates subcomponents or features of the third-party system(s) 1108 using APIs or other integrations. The third-party system(s) 1108 can include systems housed and operated on servers separate from the generative AI system 1102, such as data management systems, calendaring systems, social networking systems, search engine systems, and/or other computer systems.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

initiating, at a first client device, a locally executing generative agent running in a local runtime environment on the first client device;

establishing a persistent bi-directional connection between the local runtime environment and a backend runtime service running on one or more server devices remotely separated from the first client device;

generating, at the backend runtime service through the persistent bi-directional connection, a mirrored task object comprising executable tasks of the locally executing generative agent running in the local runtime environment; and generating, for display on a second client device interfacing with the backend runtime service and remotely separated from the one or more server devices, a remote agent control interface displaying a visual representation of one or more executable tasks of the mirrored task object.

2. The computer-implemented method of claim 1, wherein generating the mirrored task object comprises:

detecting, via the persistent bi-directional connection between the local runtime environment and the backend runtime service, instantiation of an executable task by the locally executing generative agent on the first client device; and mirroring the executable task from the locally executing generative agent to the backend runtime service on the one or more server devices.

3. The computer-implemented method of claim 1, further comprising:

detecting, at the backend runtime service, an interruption of an executable task performed by the locally executing generative agent in the local runtime environment; and providing an indication of the interruption via the remote agent control interface on the second client device.

4. The computer-implemented method of claim 3, further comprising:

detecting, at the backend runtime service, a resumption of execution of the executable task performed by the locally executing generative agent;

modifying the mirrored task object based on detecting the resumption of execution of the executable task; and modifying, for display on the second client device, the visual representation of the one or more executable tasks of the mirrored task object based on modifying the mirrored task object.

5. The computer-implemented method of claim 1, further comprising:

receiving, from the second client device via the remote agent control interface, an interaction with the visual representation of the mirrored task object;

based on receiving the interaction, determining a modification to the executable tasks of the locally executing generative agent; and instructing, via the persistent bi-directional connection, the locally executing generative agent to modify execution of the executable tasks according to the interaction.

6. The computer-implemented method of claim 1, further comprising:

identifying an enterprise environment for the locally executing generative agent by identifying a plurality of client devices that correspond to a user account of the first client device;

modifying the persistent bi-directional connection to include the plurality of client devices and the first client device; and distributing, utilizing the persistent bi-directional connection, execution of the executable tasks among the plurality of client devices.

7. The computer-implemented method of claim 1, further comprising terminating execution of executable tasks of the locally executing generative agent at the first client device based on receiving an interaction with the visual representation of the one or more executable tasks of the mirrored task object.

8. The computer-implemented method of claim 1, further comprising:

identifying an enterprise environment for the locally executing generative agent by identifying a plurality of client devices that correspond to a user account of the first client device; and establishing the persistent bi-directional connection by connecting the plurality of client devices and the first client device to the backend runtime service.

9. The computer-implemented method of claim 1, further comprising:

identifying a multi-user-account environment that comprises a user account that corresponds to the first client device, a plurality of additional user accounts that correspond to the user account, and a plurality of additional client devices that correspond to the plurality of additional user accounts;

establishing a persistent multi-user-account connection between the first client device and the plurality of additional client devices; and generating the mirrored task object based on identifying, via the persistent multi-user-account connection, a plurality of executable tasks that correspond to the first client device and the plurality of additional client devices.

10. The computer-implemented method of claim 1, wherein the executable tasks of the locally executing generative agent comprise utilizing a generative model to generate generative outputs.

11. A system comprising:

at least one processor; and at least one non-transitory computer-readable storage medium storing instructions that, when executed by the at least one processor, cause the system to:

initiate, at a first client device, a locally executing generative agent running in a local runtime environment on the first client device;

establish a persistent bi-directional connection between the local runtime environment and a backend runtime service running on one or more server devices remotely separated from the first client device;

generate a mirrored task object comprising executable tasks of the locally executing generative agent running in the local runtime environment based on receiving, at the backend runtime service, structured lifecycle events via the persistent bi-directional connection; and generate, for display on a second client device interfacing with the backend runtime service and remotely separated from the one or more server devices, a remote agent control interface displaying a visual representation of one or more executable tasks of the mirrored task object.

12. The system of claim 11, further comprising instructions that, when executed by the at least one processor, cause the system to:

detect, via the persistent bi-directional connection between the local runtime environment and the backend runtime service, a structured lifecycle event by detecting instantiation of an executable task by the locally executing generative agent on the first client device; and mirror the executable task from the locally executing generative agent to the backend runtime service on the one or more server devices.

13. The system of claim 11, further comprising instructions that, when executed by the at least one processor, cause the system to:

detect, at the backend runtime service, an incomplete lifecycle event by detecting an interruption of an executable task performed by the locally executing generative agent in the local runtime environment; and provide an indication of the interruption via the remote agent control interface on the second client device.

14. The system of claim 13, further comprising instructions that, when executed by the at least one processor, cause the system to:

detect, at the backend runtime service, a resumed lifecycle event by detecting a resumption of execution of the executable task performed by the locally executing generative agent;

modify the mirrored task object based on detecting the resumption of execution of the executable task; and modify, for display on the second client device, the visual representation of the one or more executable tasks of the mirrored task object based on modifying the mirrored task object.

15. The system of claim 11, further comprising instructions that, when executed by the at least one processor, cause the system to:

receive, from the second client device via the remote agent control interface, an interaction with the visual representation of the mirrored task object;

based on receiving the interaction, determine a modification to the executable tasks of the locally executing generative agent; and instruct, via the persistent bi-directional connection, the locally executing generative agent to modify execution of the executable tasks according to the interaction.

16. A non-transitory computer-readable medium storing instructions that, when executed by at least one processor, cause a computing device to perform operations comprising:

initiating, at a first client device, a locally executing generative agent running in a local runtime environment on the first client device;

establishing a persistent bi-directional connection between the local runtime environment and a backend runtime service running on one or more server devices remotely separated from the first client device;

generating, at the backend runtime service through the persistent bi-directional connection, a mirrored task object comprising executable tasks of the locally executing generative agent running in the local runtime environment;

generating, for display on a second client device interfacing with the backend runtime service and remotely separated from the one or more server devices, a remote agent control interface displaying a visual representation of one or more executable tasks of the mirrored task object; and instructing, at the backend runtime service, the locally executing generative agent to modify an executable task based on receiving, from the second client device via the remote agent control interface, an interaction with the visual representation of the mirrored task object.

17. The non-transitory computer-readable medium of claim 16, wherein the operations further comprise:

detecting, via the persistent bi-directional connection between the local runtime environment and the backend runtime service, instantiation of an executable task by the locally executing generative agent on the first client device; and mirroring the executable task from the locally executing generative agent to the backend runtime service on the one or more server devices.

18. The non-transitory computer-readable medium of claim 16, wherein the operations further comprise:

identifying an enterprise environment for the locally executing generative agent by identifying a plurality of client devices that correspond to a user account of the first client device; and establishing the persistent bi-directional connection by connecting the plurality of client devices and the first client device to the backend runtime service.

19. The non-transitory computer-readable medium of claim 16, wherein the operations further comprise terminating execution of executable tasks of the locally executing generative agent at the first client device based on receiving an interaction with the visual representation of the one or more executable tasks of the mirrored task object.

20. The non-transitory computer-readable medium of claim 16, wherein the operations further comprise identifying a multi-user-account environment that comprises a user account that corresponds to the first client device, a plurality of additional user accounts that correspond to the user account, and a plurality of additional client devices that correspond to the plurality of additional user accounts;

establishing a persistent multi-user-account connection between the first client device and the plurality of additional client devices; and generating the mirrored task object based on identifying, via the persistent multi-user-account connection, a plurality of executable tasks that correspond to the first client device and the plurality of additional client devices.

* * * * *